United States Patent
Pereira Almao et al.

(10) Patent No.: US 10,323,195 B2
(45) Date of Patent: Jun. 18, 2019

(54) CATALYST PREPARATION UNIT FOR USE IN PROCESSING OF HEAVY HYDROCARBONS

(71) Applicant: PC-CUPS Ltd., Calgary (CA)

(72) Inventors: Pedro Pereira Almao, Calgary (CA); Ameli Sofia Pereira Cota, Calgary (CA); Alejandro Coy Plazas, Calgary (CA); Carlos Eduardo Scott, Calgary (CA)

(73) Assignee: PC-CUPS Ltd., Calgary (AB) (CA)

( * ) Notice: Subject to any disclaimer, the term of this patent is extended or adjusted under 35 U.S.C. 154(b) by 0 days.

(21) Appl. No.: 15/564,560

(22) PCT Filed: Apr. 7, 2016

(86) PCT No.: PCT/CA2016/050399
§ 371 (c)(1),
(2) Date: Oct. 5, 2017

(87) PCT Pub. No.: WO2016/161512
PCT Pub. Date: Oct. 13, 2016

(65) Prior Publication Data
US 2018/0086990 A1    Mar. 29, 2018

Related U.S. Application Data

(60) Provisional application No. 62/143,941, filed on Apr. 7, 2015.

(51) Int. Cl.
*C10G 49/02* (2006.01)
*B01J 37/04* (2006.01)
(Continued)

(52) U.S. Cl.
CPC .............. *C10G 49/02* (2013.01); *B01D 3/14* (2013.01); *B01J 23/8885* (2013.01);
(Continued)

(58) Field of Classification Search
CPC ... B01J 8/085; B01J 8/20; B01J 27/049; B01J 27/0515; B01J 37/04; B01J 37/088;
(Continued)

(56) References Cited

U.S. PATENT DOCUMENTS

| 7,678,732 B2 * | 3/2010 | Chen ................... B01J 23/85 |
| | | 502/220 |
| 7,897,537 B2 | 3/2011 | Pereira-almao et al. |

(Continued)

FOREIGN PATENT DOCUMENTS

CA    2 810 022 A1    11/2013

OTHER PUBLICATIONS

Weissman, J.G. and R.V. Kessler, Downhole heavy crude oil hydroprocessing, Applied Catalysis A: General 1996, 140(1), p. 1-16.
(Continued)

*Primary Examiner* — Lessanework Seifu
(74) *Attorney, Agent, or Firm* — McGlew and Tuttle, P.C.

(57) ABSTRACT

A catalyst preparation unit for producing an activated hydrocarbon-catalyst mixture. The catalyst preparation unit includes one or more catalyst reactant input conduits; a hydrocarbon input conduit; a water input conduit; one or more catalyst reactant mixing and conveyance systems for receiving and mixing catalyst reactants from the catalyst component input conduits and water provided by the water input conduit to provide one or more catalyst reactant solutions; one or more hydrocarbon mixing and conveyance systems for receiving and mixing the catalyst reactant solutions and hydrocarbons provided by the hydrocarbon input conduit to produce a hydrocarbon-catalyst reactant mixture; at least one reactor located downstream of the mixers, for receiving and activating the hydrocarbon-catalyst reactant mixture, thereby producing the activated hydrocarbon cata-
(Continued)

lyst mixture; a gas/liquid separator located downstream of the reactor, for removing vapors and gas from the activated hydrocarbon-catalyst mixture; and an output conduit for transporting the activated hydrocarbon-catalyst mixture away from the catalyst preparation unit.

21 Claims, 11 Drawing Sheets

(51) Int. Cl.
| | |
|---|---|
| B01J 37/00 | (2006.01) |
| B01J 23/888 | (2006.01) |
| B01J 27/051 | (2006.01) |
| B01J 35/02 | (2006.01) |
| B01D 3/14 | (2006.01) |
| C10G 7/00 | (2006.01) |

(52) U.S. Cl.
CPC ......... *B01J 27/0515* (2013.01); *B01J 35/023* (2013.01); *B01J 37/00* (2013.01); *B01J 37/0036* (2013.01); *B01J 37/04* (2013.01); *C10G 7/00* (2013.01); *C10G 2300/308* (2013.01)

(58) Field of Classification Search
CPC .... B01J 2219/0002; B01J 2219/00022; C10G 47/26; C10G 47/06; C10G 49/02; C10G 49/04; C10G 49/12; C10G 49/22
See application file for complete search history.

(56) References Cited

U.S. PATENT DOCUMENTS

| | | | |
|---|---|---|---|
| 8,283,279 | B2 | 10/2012 | Pereira-almao et al. |
| 8,298,982 | B2 | 10/2012 | Pereira-almao et al. |
| 8,304,363 | B2 | 11/2012 | Pereira-almao et al. |
| 8,551,907 | B2 | 10/2013 | Pereira et al. |
| 2009/0221723 | A1* | 9/2009 | Leviness .................. B01J 8/22 518/709 |

OTHER PUBLICATIONS

Galarraga, C.E. and P. Pereira-Almao, Hydrocracking of Athabasca bitumen using submicronic multimetallic catalysts at near in-reservoir conditions, Energy & Fuels 2010, 24(4), p. 2383-2389.

Luis Alejandro Coy, and P. Pereira-Almao, Experimental Reactive Simulation of a Hot Fluid Injection Process for In-Reservoir Upgrading, World Heavy Oil congress 2014. New Orleans, LA, USA: DMG Energy Conferences.

Zamani, A., et al., Experimental study on transport of ultra-dispersed catalyst particles in porous media, Energy & Fuels, 2010. 24(9): p. 4980-4988.

Zamani, A., et al., Flow of nanodispersed catalyst particles through porous media: Effect of permeability and temperature, The Canadian Journal of Chemical Engineering, 2012, 90(2): p. 304-314.

Weissman, J.G et al., Down-hole catalytic upgrading of heavy crude oil, Energy & Fuels 1996, 10(4): p. 883-889.

* cited by examiner

CATALYST PREPARATION UNIT FOR USE IN PROCESSING OF HEAVY HYDROCARBONS

FIELD OF THE INVENTION

The invention relates to the field of processing of hydrocarbons and provides a catalyst preparation unit for producing a mixture of activated catalyst for this purpose.

BACKGROUND OF THE INVENTION

The use of catalysts in the processing of hydrocarbons is well known. Catalysts enable hydrocarbon processing reactions, such as hydro-treating, hydrocracking, steam cracking or upgrading reactions, to proceed more efficiently under various reaction conditions with the result that the overall efficiency and economics of a process are enhanced. Different catalysts are more effective in certain reactions than others and, as a result, significant research is conducted into the design of catalysts in order to continue to improve the efficiencies of reactions. Many factors such as catalyst chemistry, particle size, support structure and the reaction chemistry to produce the catalyst are very important in determining the reaction efficiency and effectiveness as well as the economics of a particular catalyst.

Catalysts can be generally categorized as supported and unsupported catalysts. Supported catalysts are more widely used due to several advantages including the high surface area available to anchor active phases (usually metals) predominantly responsible for the catalytic activity on the support. One advantage of supported catalysts over unsupported catalysts is that no separation of catalysts from reactants and products is required from within or outside the reaction vessel.

While effective in many applications, supported catalysts are at a disadvantage when used with feedstocks that inevitably produce solid deposits within the porous network of the catalyst support. In such cases a progressive loss of catalyst performance due to pore plugging occurs, making larger quantities of catalysts required for a given process to maintain efficient reactions.

Unsupported catalysts are not physically supported on a solid matrix and therefore are less expensive to produce. In reactions where unsupported catalysts are soluble in the reaction media, difficulties in recovery of the catalysts from the product stream increase reaction or production costs because the catalysts must be replaced. There may also be a requirement for the reactants to be subjected to costly separation processes. Frequently, unsupported metal based catalysts with equivalent particle sizes or diameters to supported catalysts offer lower surface area of catalytic active phases. However, unsupported catalysts with particle sizes below the micron range provide advantages over supported catalysts by increasing the surface area available of active sites for reaction and thus, may enable a reaction to proceed more efficiently as compared to a reaction utilizing a supported catalyst.

While there is no universal rule with respect to the superiority of one class of catalyst over another, in many systems, a primary consideration in choosing or designing a catalyst system is the potential trade-off between the reaction efficiency and costs of unsupported catalysts versus supported catalysts.

In situ upgrading of hydrocarbons directly in a reservoir has become more feasible with development of processes using a high heating capacity fluid extracted from the same produced crude oil. This heating fluid may also be used as the heat conductor for the nano-catalyst which is needed to promote the upgrading reactions at relatively low temperatures.

The option of using conventional (heterogeneous) upgrading catalysts, to process heavy crude oil produced in a reservoir or very close to the producing well has been investigated. One of the most significant improvements in this area has led to the possibility of applying the process well to well, and, as a result, smaller scale equipment can be used which will resist pressure. Because the upgrading reactions occur within the reservoir, the small amount of coke that could be produced would remain within the reservoir (Weissman, J. G. and R. V. Kessler, Downhole heavy crude oil hydroprocessing. Applied Catalysis A: General, 1996. 140(1): p. 1-16, incorporated herein by reference in entirety).

Catalytic upgrading near the producing well has been investigated in an upgrading process which includes placing a catalyst in the producing well through conventional injection techniques and heating the production zone using electric elements, and injecting hydrogen or synthesis gas in the producing well. In this way, the fluids coming from the in situ combustion are forced to pass through the reservoir matrix. Results from various experiments indicated a larger production of hydrogen and hydrocarbons in the case of the catalytic test in comparison with the non-catalytic test. An increase of 8 degrees API was also observed in the density of the catalytic product, and a reduction of around 50% m of sulfur (Weissman, J. et al., Down-hole catalytic upgrading of heavy crude oil. Energy & Fuels, 1996. 10(4): p. 883-889, incorporated herein by reference in entirety). However, the risk of contact between fluids from in situ combustion and synthesis gas or hydrogen at a high temperature is an important challenge for the control of that process.

The abovementioned investigations did not provide solutions to major challenges of a real-world upgrading process. The problem of incorporating a catalyst through the porous media of the reservoir in conditions different to those of air injection, and avoiding the deactivation of the catalyst was not addressed. This last challenge involves the maintenance of an economic process while reducing coke formation that at the same time is the cause and consequence of catalyst deactivation.

As such, one of the existing main challenges is the rapid deactivation or poisoning of the catalyst due to the large amount of contaminants such as: asphaltenes, sulfur and metals (Galarraga, C. E. and P. Pereira-Almao, Hydrocracking of Athabasca bitumen using submicronic multimetallic catalysts at near in-reservoir conditions. Energy & Fuels, 2010, 24(4): p. 2383-2389, incorporated herein by reference in entirety). Another challenge involves the transport of heat to the reservoir in a conventional (non-electrical) and continuous manner, without incurring large costs of energy transfer and while ensuring production with a stable increase in quality and crude oil. In situ combustion produces upgraded products only at the end of its lifetime. At the same time, this process produces olefins in significant amounts when insufficient levels of hydrogen are present.

Hydrocracking of bitumen using a variety of ultra-dispersed catalysts based on metallic particles (nickel, cobalt, tungsten and molybdenum) nano or sub-micron particles has been described (U.S. Pat. Nos. 8,551,907, 8,304,363, 8,298, 982, 8,283,279, and 7,897,537 each of which is incorporated herein by reference in entirety).

These ultra-dispersed catalysts have been investigated under conditions similar to the conditions existing in the reservoirs of the Athabasca region of Alberta, Canada, with sand packing within a permeability range between about 1 to about 12 Darcies. The tests performed (with or without catalysts) were between about 270° C. and about 380° C. and between about 8 and about 210 hours for crude oil. With the catalyst contact and the hydrogen flowing continuously, it was confirmed that the ultra-dispersed catalysts increase conversion, reduce micro carbon residue, reduce coke formation, and increase desulfurization. It was also confirmed that upon increasing temperature, the conversion of the residue fraction of the crude oil increases and the quality of the hydrocarbon product is reproducibly improved in terms of density, viscosity, and sulfur levels (Luis Alejandro Coy, P. P.-A. Experimental Reactive Simulation of a Hot Fluid Injection Process for In-Reservoir Upgrading. In World Heavy Oil congress 2014. New Orleans, La., USA: DMG Energy Conferences; Galarraga, C. E. and P. Pereira-Almao, Hydrocracking of Athabasca bitumen using submicronic multimetallic catalysts at near in-reservoir conditions. Energy & Fuels, 2010. 24(4): p. 2383-2389; Rendon, V., Experimental Evaluation of In Situ Upgrading by Continuous Injection of Submicronic Catalysts at Moderate Temperatures with Hydrogen Addition, in Schulich School of Engineering. 2011, University of Calgary: Calgary. p. 238, each of which is incorporated herein by reference in entirety).

The transportability of ultra-dispersed catalysts in vacuum gas oil (VGO) initially at a temperature close to 25° C. has been described. Most notably, the surfactant that could be used in the preparation of the ultra-dispersed catalysts does not decompose entirely under the tested conditions, and that it had a tendency to form emulsions within a packed bed (previously saturated with water), precipitating some particles causing blocking of the packing, especially at its entrance. In a later test studying the effect of formation water, it was found that retention of the catalyst at the surface of the sand is slightly higher (approx. 18%) than the injected amount, given the absence of water at the surface of the sand grains. It was also found that the metallic particles suspended in the fluid, within the packing, were dragged out of the system, whereas those previously retained in the bed were not significantly affected. Further experiments at higher temperature show that the flow of a hydrocarbon stream with nano-dispersed catalysts can easily propagate through a packed bed without negatively affecting the permeability of the packed bed (Zamani, A., B. Maini, and P. Pereira-Almao, Experimental study on transport of ultra-dispersed catalyst particles in porous media. Energy & Fuels, 2010. 24(9): p. 4980-4988; Zamani, A., B. Maini, and P. Pereira-Almao, Flow of nanodispersed catalyst particles through porous media: Effect of permeability and temperature. The Canadian Journal of Chemical Engineering, 2012, 90(2): p. 304-314, each of which is incorporated herein by reference in entirety).

Tests at higher temperature (150° C.) with low concentration of ultra dispersed catalysts showed retention of the catalyst of at least 20%. At higher temperature 280° C. or more no evidence of the catalyst at the exit of the packing was found. Thus retention is increased at high temperatures of at least 150° C. It is possible that hydrodemetalation reactions could be taking place at the highest temperatures indicated. Permeability reduction in the highest temperature tests was 5 to 1.9 Darcies after the injection of over 60 porous volumes through the packing and submitting it to diverse reaction conditions, with and without nano catalysts (Rendón, V., Experimental Evaluation of In Situ Upgrading by Continuous Injection of Submicronic Catalysts at Moderate Temperatures with Hydrogen Addition, in Schulich School of Engineering. 2011, University of Calgary: Calgary. p. 238, incorporated herein by reference in entirety).

The result of these investigations indicate that it is possible to inject an emulsion made up of heavy hydrocarbons, hydrogen and ultra-dispersed catalysts into a reservoir without damaging the structure of the reservoir. Moreover, it was confirmed that it is possible to fill the packed bed with sub micron particles, and that once inside the reservoir, the packed bed turns into a "fixed bed" type reactor, which can improve hydrocarbon streams without further addition of catalysts by adding a small amount of hydrogen. One such example is found in Canadian patent 2,810,022, which is incorporated herein by reference in entirety.

With these recent advancements in hydrocarbon processing technology, it is now possible to develop systems for performing larger scale processing of hydrocarbons. As a result, a number of problems must be addressed to take full advantage of the technology. One such problem is a requirement for a catalyst preparation unit with sufficient flexibility to produce hydrocarbon processing catalysts efficiently and at relatively low cost.

SUMMARY OF THE INVENTION

In accordance with a first aspect of the invention, a catalyst preparation unit for producing an activated hydrocarbon-catalyst mixture is described, the catalyst preparation unit comprising: one or more catalyst reactant input conduits; a hydrocarbon input conduit; a water input conduit; one or more catalyst reactant mixing and conveyance systems for receiving and mixing catalyst reactants from the catalyst component input conduits and water provided by the water input conduit to provide one or more catalyst reactant solutions; one or more hydrocarbon mixing and conveyance systems for receiving and mixing the catalyst reactant solutions and hydrocarbons provided by the hydrocarbon input conduit to produce a hydrocarbon-catalyst reactant mixture; at least one reactor located downstream of the mixers, for receiving and activating the hydrocarbon-catalyst reactant mixture, thereby producing the activated hydrocarbon catalyst mixture; a gas/liquid separator located downstream of the reactor, for removing vapors and gas from the activated hydrocarbon-catalyst mixture; and an output conduit for transporting the activated hydrocarbon-catalyst mixture away from the catalyst preparation unit.

In one embodiment, the catalyst reactant input conduits, and the catalyst reactant mixing and conveyance systems are chemically compatible with ammonium heptamolybdate, ammonium metatungstate, nickel acetate, cobalt acetate, ammonium sulfide and thiourea or any combination thereof.

In one embodiment, the catalyst reactant input conduits include three metal salt conduits and a sulfur source compound conduit.

In one embodiment, the catalyst reactant input conduits include two metal salt conduits and a sulfur source compound conduit.

In one embodiment, wherein the catalyst reactant input conduits include one metal salt conduit and a sulfur source compound conduit.

In a further embodiment, each of the catalyst reactant mixing and conveyance systems include a solution mixer for generating a catalyst reactant solution and a dosing pump for conveying specified volumes of the catalyst reactant solution to one of the hydrocarbon mixing and conveyance systems.

In one embodiment, each of the hydrocarbon mixing and conveyance systems comprises a centrifugal pump and an inline mixer, wherein the centrifugal pump is for drawing the hydrocarbons from outside of the catalyst preparation unit and conveying the hydrocarbons to the inline mixer for mixing with the catalyst reactant solution.

In one embodiment, two catalyst reactant mixing and conveyance systems and two hydrocarbon mixing and conveyance systems are provided, wherein one of the two catalyst reactant mixing and conveyance systems is configured to convey a solution of two different metal salts and a sulfur source compound and the other catalyst reactant mixing and conveyance system is configured to convey a third metal salt solution, and wherein one of the two hydrocarbon mixing and conveyance systems is configured to receive and mix the solution of the two different metal salts and the sulfur source compound with the hydrocarbons to produce a first hydrocarbon-catalyst mixture and convey the first hydrocarbon-catalyst reactant mixture to the reactor, and the other hydrocarbon mixing and conveyance system is configured to receive and mix the solution of the third metal salt with the hydrocarbons to produce a second hydrocarbon-catalyst reactant mixture and convey the second hydrocarbon-catalyst reactant mixture to the reactor.

In one embodiment, the catalyst preparation unit includes three catalyst reactant mixing and conveyance systems, three hydrocarbon mixing and conveyance systems, and three reactors, wherein each of the three catalyst reactant mixing and conveyance systems is configured to convey a solution of a different metal salt and a sulfur source compound to a corresponding hydrocarbon mixing and conveyance system of the three hydrocarbon mixing and conveyance systems, thereby producing three different hydrocarbon-catalyst reactant mixtures and wherein each of the three hydrocarbon mixing and conveyance systems is further configured to convey its respective hydrocarbon-catalyst reactant mixture of the three different hydrocarbon-catalyst reactant mixtures to one of three corresponding reactors.

In one embodiment, reactor output from each of the three corresponding reactors is merged upstream of the gas/liquid separator.

In various embodiments, the catalyst preparation unit further includes a hydrogen input conduit for addition of hydrogen to the activated hydrocarbon-catalyst mixture in the output conduit.

In one embodiment, the hydrocarbon input conduit is configured for conveyance of heavy oil and in yet further embodiments, the heavy oil is a distillation residue from a heavy oil upgrading process with an API gravity of about 20° or less.

In various embodiments, the catalyst preparation unit is provided in modular form and configured for disengagement from a hydrocarbon processing facility, transport by a vehicle and engagement to another hydrocarbon processing facility.

In yet further embodiments, the catalyst preparation unit produces an activated hydrocarbon-catalyst mixture, the catalyst preparation unit comprising: a catalyst reactant input conduit; a hydrocarbon input conduit; a catalyst reactant and hydrocarbon mixing and conveyance system for receiving and mixing catalyst reactants from the catalyst reactant input conduit with hydrocarbons provided by the hydrocarbon input conduit to produce a catalyst reactant and hydrocarbon mixture; a reactor located downstream of the catalyst reactant and hydrocarbon mixing and conveyance system, for receiving and activating the hydrocarbon-catalyst reactant mixture, thereby producing the activated hydrocarbon catalyst mixture; a gas/liquid separator located downstream of the reactor, for removing vapors and gas from the activated hydrocarbon-catalyst mixture; and an output conduit for transporting the activated hydrocarbon-catalyst mixture away from the catalyst preparation unit.

In a further embodiment, the catalyst reactant input conduit is configured for conveyance of a composite mixture of catalyst reactants in solid form.

In yet a further embodiment, the catalyst reactant input conduit and the catalyst reactant and hydrocarbon mixing and conveyance system are chemically compatible with ammonium heptamolybdate, ammonium metatungstate, nickel acetate, cobalt acetate, ammonium sulfide and thiourea or any combination thereof.

In a further embodiment, the catalyst reactant and hydrocarbon mixing and conveyance system comprises a mill for reducing the particle size of reactants, a high shear mixer downstream of the mill for further reducing the particle size of the reactants.

In one embodiment, the catalyst preparation unit further includes a centrifugal pump for conveying the hydrocarbon-catalyst reactant mixture to the reactor.

In yet another embodiment, the catalyst preparation unit further includes a hydrogen input conduit for addition of hydrogen to the activated hydrocarbon-catalyst mixture in the output conduit.

In one embodiment, the hydrocarbon input conduit is configured for conveyance of heavy oil and more specifically, in further embodiments, the heavy oil is a distillation residue from a heavy oil upgrading process with an API gravity of about 20° or less.

In another aspect, the invention describes a combination catalyst preparation unit for producing an activated hydrocarbon-catalyst mixture by either a mono-metallic catalyst preparation process or a composite salt feed process, the combination catalyst preparation unit comprising: the catalyst preparation unit as above for the mono-metallic catalyst preparation process; and the catalyst preparation unit as recited above for the composite salt feed process, wherein at least one of the three reactors used for the mono-metallic catalyst preparation process is shared by the catalyst preparation unit for the composite salt feed process; and the gas/liquid separator and the output conduit used for the mono-metallic catalyst preparation process are both shared by the catalyst preparation unit for the composite salt feed process.

In another embodiment, the catalyst preparation unit further includes a hydrogen input conduit for addition of hydrogen to the activated hydrocarbon-catalyst mixture in the output conduit.

Additionally, the hydrocarbon input conduit may be configured for conveyance of heavy oil and in further embodiments, wherein the heavy oil is a distillation residue from a heavy oil upgrading process with an API gravity of about 20° or less.

Further, the catalyst preparation unit may be provided in modular form and configured for disengagement from a hydrocarbon processing facility, transport by a vehicle and engagement to another hydrocarbon processing facility.

In another aspect, the invention describes an in situ hydrocarbon upgrading facility configured to process hydrocarbons by injection of a mixture of activated catalyst and hydrocarbons into a reservoir wherein the mixture of activated catalyst and hydrocarbons is generated using any of the catalyst preparation units as described herein.

BRIEF DESCRIPTION OF THE DRAWINGS

Various objects, features and advantages of the invention will be apparent from the following description of particular embodiments of the invention, as illustrated in the accompanying drawings. Emphasis is placed upon illustrating the principles of various embodiments of the invention. Similar reference numerals indicate similar components.

DETAILED DESCRIPTION OF THE INVENTION

Introduction and Overview

Figure 1:
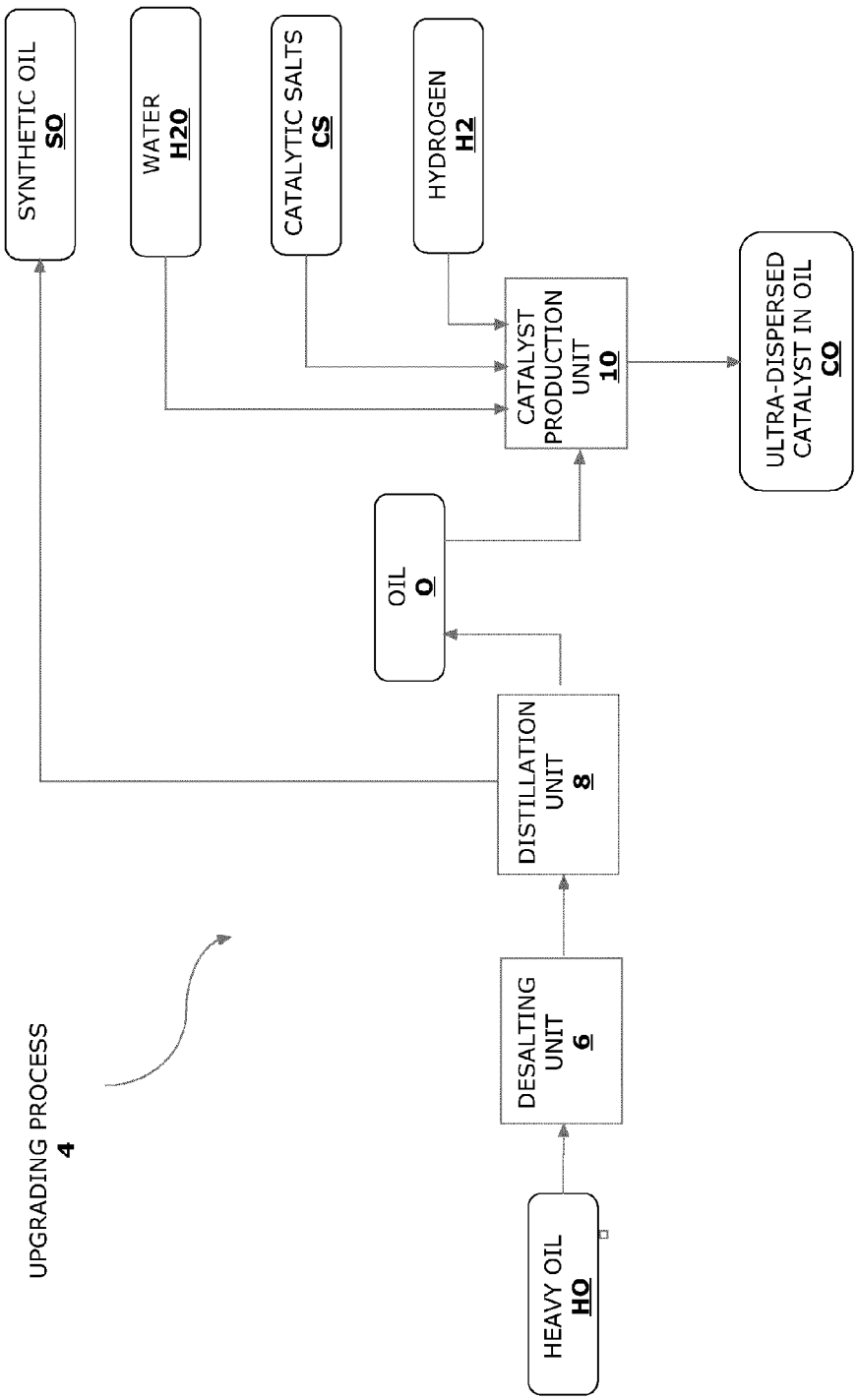
FIG. 1 is a block diagram showing an embodiment of a hydrocarbon upgrading process.

A number of embodiments will now be described with reference to the Figures which illustrate process flow of example embodiments. Emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at alternative embodiments of the present invention and that such alternative embodiments are within the scope of the invention. Wherever possible, similar reference numbers indicate similar features.

Embodiments of a catalyst preparation unit are described. The catalyst preparation unit is designed to produce a mixture of ultra-dispersed catalyst in oil for subsequent use in a hydrocarbon processing operation which will typically include significant in situ upgrading of heavy hydrocarbons in a reservoir to produce upgraded hydrocarbon products.

The definitions of various terms as provided herein are intended to provide guidance to the skilled reader with regards to the principles and scope of the invention and where appropriate define particular limits as reasonably understood by such a reader.

Definitions

As used herein, the term "heavy oil" refers to any liquid petroleum product with an API gravity value between 22.2° and 10°. API gravity is a scale developed by the American Petroleum Institute and represents a modification of the equation for determination of specific gravity. API gravity and methods for its determination are well known to those skilled in the art of petroleum extraction. One example of a classification system of crude oil according to API gravity values is provided in Table 1 (www.petroleum.co.uk), incorporated herein by reference in entirety). Other classification systems may have different value ranges and possibly other categories such as "extra light" crude oil.

TABLE 1

| Crude Oil API Gravity Classification | |
|---|---|
| Crude Oil Classification | API Gravity Value |
| Light | 31.1° or Higher |
| Medium | 22.3° to 31° |
| Heavy | 22.2° to 10° |
| Extra Heavy (Bitumen) | Lower than 10° |

As used herein, the term "conduit" is used to describe any means for conveying solids or liquids within the catalyst preparation unit. Examples include, but are not limited to tubes or pipes which may be coupled to conveyance means driven by various types of liquid pumps or vacuum sources for conveyance of liquids, as well as gravity chutes or conveyor belts driven by mechanical means for conveyance of solids.

As used herein, the terms "downstream" and "upstream" are relative terms used to identify locations in a process with respect to one or more other locations. A downstream location with respect to another location is a position closer to the end of the process than the other location. An upstream location with respect to another location is a position closer to the beginning of the process than the other location. These terms are in common usage in the arts relating to process engineering and are well understood by those skilled in the art.

As used herein, the term "activated hydrocarbon-catalyst mixture" refers to a mixture of an active catalyst and hydrocarbons in liquid form. The catalyst is a metal-based catalyst designed for cracking of hydrocarbons. Examples include, but are not limited to, the catalysts described in U.S. Pat. Nos. 8,304,363, 8,298,982, 8,283,279, and 7,897,537 (each of which is incorporated herein by reference in entirety).

As used herein, the term "catalyst reactant mixing and conveyance system" refers to a system having any means for mixing a catalyst reactant with a liquid and for conveying the resulting mixture to a downstream processing component of the catalyst preparation unit. Equipment for mixing and conveyance of liquids is known to those with skill in the arts relating to process engineering and can be adapted to the catalyst preparation unit of the present invention without undue experimentation. As used herein, the similar term "hydrocarbon mixing and conveyance system" refers to a system having any means for mixing a liquid hydrocarbon with a liquid and for conveying the resulting mixture to a downstream processing component of the catalyst preparation unit. "Conveyance" in both definitions means may be provided by pumps or vacuum means. Equipment used for mixing and conveyance of liquid mixtures and hydrocarbon liquid mixtures is known to those with skill in the arts relating to process engineering and can be adapted to the catalyst preparation unit of the present invention without undue experimentation.

As used herein, the term "reactor" refers to a vessel wherein a chemical reaction takes place. Reactors may be provided with means for controlling temperature, pressure and other parameters for promotion of chemical reactions.

As used herein the term "sulfur source compound" is any compound that can be used to provide sulfur as a reactant in preparation of activated catalysts including, but not limited to the catalysts described in U.S. Pat. Nos. 8,304,363, 8,298,982, 8,283,279, and 7,897,537 (each incorporated herein by reference in entirety).

As used herein, the term "dosing pump" is any pump provided with a means for controlling the addition of a liquid to a process.

As used herein, the term "high-shear mixer" refers to an apparatus configured to disperse or transport one phase or ingredient (liquid, solid, gas) into a main continuous phase (liquid), with which it would normally be immiscible. A rotor or impeller, together with a stationary component known as a stator, or an array of rotors and stators, is used either in a tank containing the solution to be mixed, or in a pipe through which the solution passes, to create shear. A high-shear mixer can be used to create emulsions, suspensions, lyosols (gas dispersed in liquid), and granular products.

As used herein, the term "mill" refers to an apparatus for grinding solid material into particles of smaller sizes.

As used herein, the terms "hydrocarbon upgrading" and "upgrading" are synonymous and refer to processes for obtaining higher value products from a lower quality mixture of hydrocarbons, typically in liquid form and generally refer to processes that result in a higher API gravity product compared to a lower API gravity starting material.

Hydrocarbon Upgrading Processes

Embodiments of the catalyst preparation unit of the present invention are designed for operation as part of hydrocarbon upgrading processes, which may be an in situ process (i.e. where hydrocarbon processing occurs within a reservoir), or a surface-based upgrading process. In one example of a hydrocarbon upgrading process, a fraction of heavy oil is distilled to separate lower boiling point hydrocarbon products and the remaining less volatile fraction (lower API gravity) is further processed by the catalyst preparation unit. An ultra-dispersed catalyst in oil is the end-product of the further processing and this end product may be injected into a reservoir to produce a packed catalytic bed which promotes the ensuing in situ upgrading process. Components of an example of an upgrading process are described in general terms. The skilled person will understand the functions of these components and will thus understand the context of operation of the catalyst preparation unit of the present invention.

Shown in FIG. 1 is an example of an upgrading process 4 for treating crude oil typically having been recovered from an oil reservoir. The crude oil may be comprised of a plurality of fractions including various fractions as described above. In the subject invention, the crude oil will typically have a higher proportion of heavy oil fractions and hence is described as a heavy oil HO. The heavy oil HO is first subjected to desalting in desalting unit 6. Generally, removal of salt and water are required to prevent corrosion in the processing units as well as preventing chemical interaction of the salts with the catalysts designed for the upgrading process. The desalting process is also provided to reduce most impurities and suspended sediments present in the crude oil sample. The desalted sample is then sent to a distillation unit 8 wherefrom two fractions are obtained; a synthetic oil fraction SO which is composed of products such as naptha, kerosene and other compounds with initial boiling points generally less than 250° C. Such compounds may be considered as "higher value products". The remaining fraction is indicated as oil O in FIG. 1 and will be comprised of those compounds that are generally considered as heavy oil compounds and/or "lower value products". In certain embodiments (not shown in FIG. 1), the remaining fraction is further subjected to vacuum distillation to remove further compounds with initial boiling points generally lower than 450° C. As is understood, various combinations of separation processes may be utilized to produce a desire oil O feed. In one embodiment, and for the purposes of description herein, the remaining oil is designated vacuum residue (API gravity less than 8) and is used to feed the catalyst preparation unit 10. Inputs into the catalyst preparation unit 10 include water H2O, catalytic salts CS and hydrogen H2 and the output from the catalyst preparation unit is an ultra-dispersed catalyst-in-oil mixture CO. In preferred embodiments, the particle sizes of the catalysts are in the sub-micron-particle or nano-particle range, in order to provide increased catalytic efficiency and longevity. Specific equipment used for desalting and distillation is known to the skilled person and can be readily adapted for use in this process without undue experimentation. Embodiments of the catalyst preparation unit 10 are described hereinbelow.

Catalyst Preparation Unit

A series of embodiments of a catalyst preparation unit will now be described. Each of these embodiments may use the vacuum residue described above with respect to the upgrading process of FIG. 1, or heavy oil from different sources as the oil component to form the ultra-dispersed catalyst in oil.

The processes developed to produce embodiments of an ultra-dispersed catalyst are described in U.S. Pat. Nos. 8,304,363, 8,298,982, 8,283,279, and 7,897,537 (each incorporated herein by reference in entirety). While the foregoing patents describe catalysts in the nano-particle size range, it is understood that it is not essential that the products and processes described herein are restricted in the subject application to the particle sizes described in these patents. Three distinct processes are described which are designated as (i) preparation of ultra-dispersed mono-, bi- or tri-metallic catalyst, (ii) salt composite feed, and (iii) preparation of ultra-dispersed mono-metallic catalyst.

These three process options are described herein as including three functional zones (as shown in FIGS. 2 to 5); (a) a mixing zone, (b) a catalyst activation zone, and (c) a separation zone. In general terms, the oil is mixed with the salts in the mixing zone and the mixture is conveyed to the catalyst activation zone where the metals are activated. Next, the activated metal/oil mixture is conveyed to the separation zone, where all gases and vapors are separated from the liquid. In one particular embodiment, which is applicable to each tri-metallic catalyst preparation, salt composite feed, and mono-metallic catalyst preparation, the ultra-dispersed catalyst in oil is used for in situ catalytic upgrading as described in Canadian Patent 2,810,022 (incorporated herein by reference in entirety), hydrogen is mixed with the ultra-dispersed catalyst in oil and the resulting mixture is injected into the well according to known methods. The skilled person will recognize that the catalyst preparation unit of the invention need not be configured for immediate mixing with hydrogen in cases where it may be desirable to store the accumulated ultra-dispersed catalyst in oil for later injection into a well. The hydrogen can then be mixed outside of the catalyst preparation unit just prior to injection. In this case, the hydrogen input into the separation zone is omitted from the embodiments of the catalyst preparation unit described hereinbelow.

A number of conduits are employed throughout the catalyst preparation unit for conveyance of materials to and from different components of the catalyst preparation unit. The selection of and manner of making connections between various conduits and the components of the catalyst preparation unit are routine tasks for those with skill in the art of process engineering. Some of the factors to be considered in selecting conduit materials are chemical compatibility, pressures, flow rates and temperatures of fluids being conveyed.

Embodiment 1: Catalyst Preparation Unit for Preparation of Tri-Metallic Catalyst According to one embodiment of the present invention, a catalyst preparation unit is provided which is designed to prepare ultra-dispersed catalyst in oil according to a process designated herein as "preparation of tri-metallic catalyst." This embodiment of the catalyst preparation unit is shown in two parts (100A and 100B) in FIGS. 2A and 2B, respectively. One particular example of a process for production of a trimetallic catalyst is the production of Ni—W(S)MoO$_3$ catalyst which is described in Example 4 of U.S. Pat. No. 7,897,537 which is incorporated herein by reference in entirety. The present embodiment is an appropriate platform for producing this and other similar metal-based hydrocarbon processing catalysts.

Figure 2A:
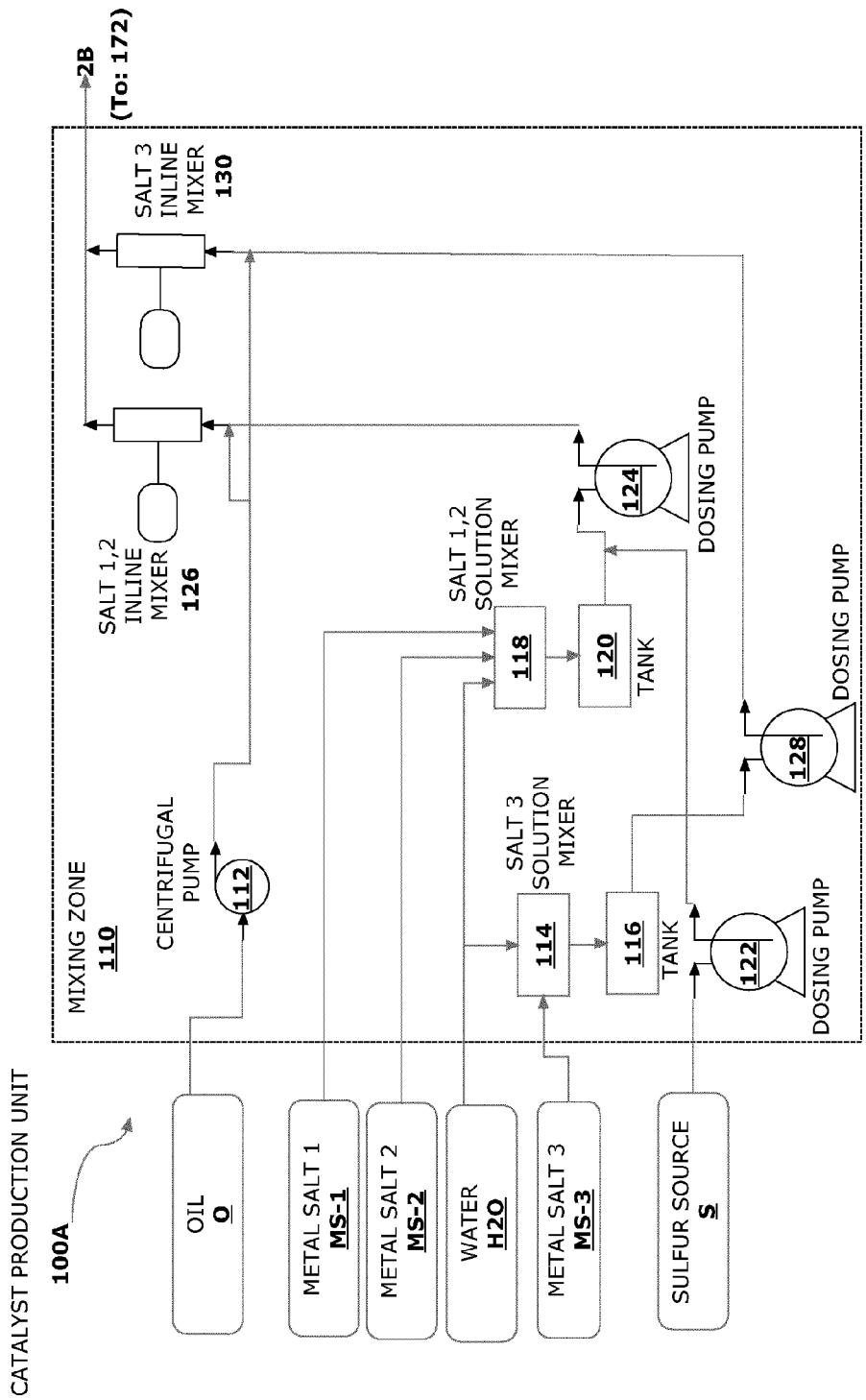
FIG. 2A is the first part of a process flow diagram for a catalyst preparation unit that produces a mixture of an activated ultra-dispersed catalyst (UDC) in oil, according to a first process designated as Tri-metallic Catalyst Preparation.

Turning now to FIG. 2A, which shows part 100A of the catalyst preparation unit, it is seen that material inputs into this part 100A of the catalyst preparation unit include an oil O (which may be a heavy oil fraction or vacuum distillation residue or similar sample), three different metal salts (MS-1, MS-2 and MS-3), water H2O and one or more compounds providing a reactant source of sulfur S.

In certain embodiments, the metal salts used to prepare the catalyst include salts of one group VIIIB non-noble metal, and two group VIB metals, as described in U.S. Pat. Nos. 8,304,363, 8,298,982, 8,283,279, and 7,897,537, each of which is incorporated herein by reference in entirety. In certain embodiments, the two group VIB metals are molybdenum and tungsten and the group VIIIB metal is nickel or cobalt. In certain embodiments, metal salt 1 MS-1 is ammonium heptamolybdate, metal salt 2 MS-2 is ammonium metatungstate and metal salt 3 MS-3 is nickel acetate. In certain embodiments, the source of sulfur S is ammonium sulfide or thiourea.

The oil O is drawn into the catalyst preparation unit 100A by a centrifugal pump 112 located in the mixing zone 110 of the catalyst preparation unit 100A. All of the processing steps described hereinbelow with respect to FIG. 2A occur within the mixing zone 110. The centrifugal pump 112 then sends the oil to a first mixer 126 for mixing of metal salt 1 MS-1 and metal salt 2 MS-2 with the oil O and to a second mixer 130 for mixing of metal salt 3 MS-3 with the oil O.

In each case, the metal salts MS-1, MS-2 and MS-3 are conveyed to solution mixers where they are mixed with water to form solutions. The water H2O is conveyed to the mixers from outside of the catalyst preparation unit. Metal salt 1 MS-1 and metal salt 2 MS-2 are both conveyed by respective conduits to the metal salt 1, 2 solution mixer 118. After mixing to form a solution of both of these metal salts, the solution is stored in a tank 120. Metal salt 3 MS-3 is mixed in a batch mode with water in metal salt 3 solution mixer 114 until all salts are dissolved, and then the resulting solution is stored in tank 116. The solution mixture of tank 120 which contains the mixture of metal salt 1 MS-1 and MS-2 is in fluid communication with a dosing pump 124 which draws specified volumes of solution from tank 120 and conveys these volumes to mixer 126. Likewise, the solution mixture of tank 116 containing the solution of metal salt 3 MS-3 in fluid communication with another dosing pump 128 which draws specified volumes of solution from tank 116 and conveys these volumes to mixer 130. In this embodiment and in embodiment 3 described hereinbelow, the combination of a given solution mixer, tank and dosing pump (such as mixer 118, tank 120, and dosing pump 124) is referred to as a "catalyst reactant mixing and conveyance system."

The external sulfur source compound S in solution form is drawn into the mixing zone 110 by another dosing pump 122. This dosing pump 122 conveys specified volumes of the sulfur source solution to the line connecting tank 120 with dosing pump 124. Thus the solution conveyed to inline mixer 126 from dosing pump 124 also includes the sulfur source compound S.

Figure 2B:
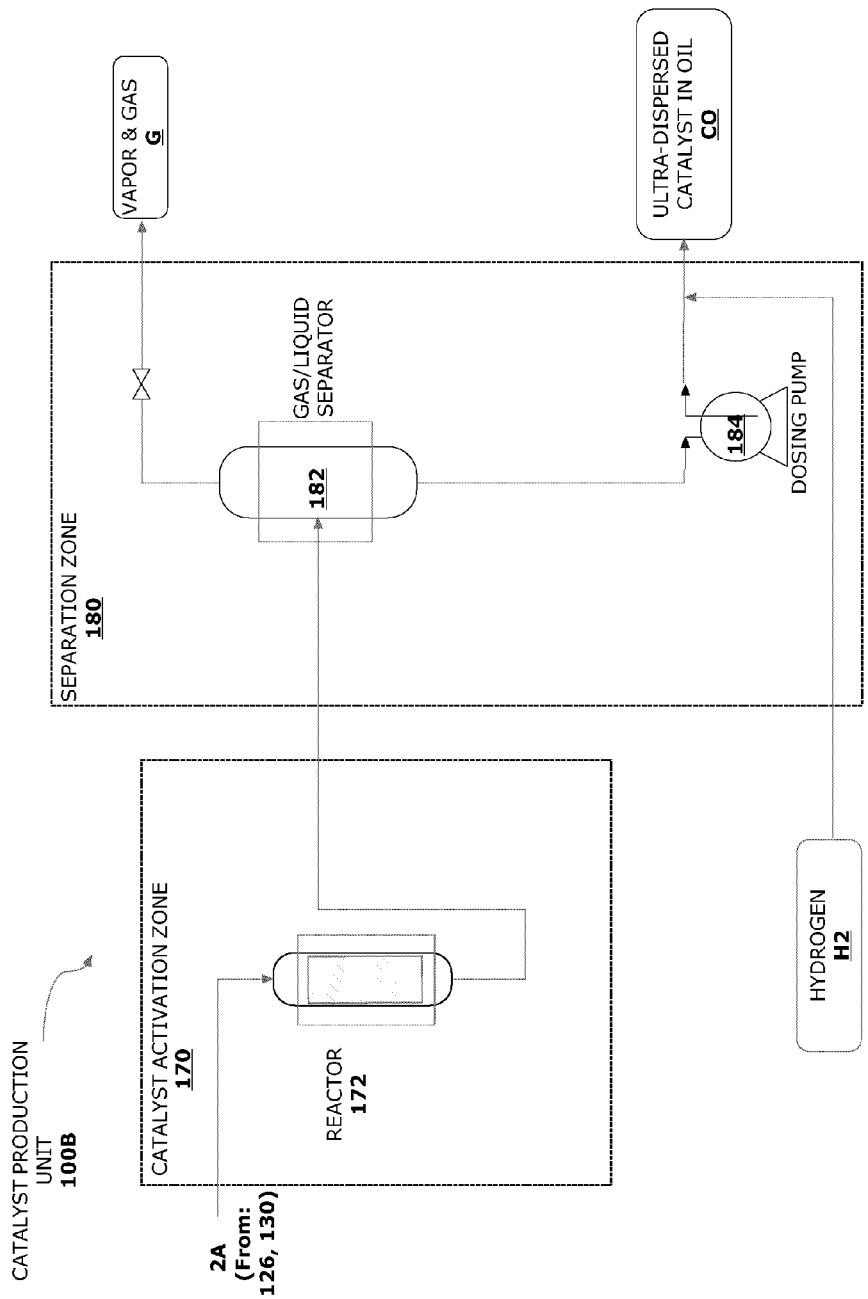
FIG. 2B is the second part of a two-part process flow diagram described in FIG. 2A.

Inline mixer 126 receives and mixes the oil O and the solution containing metal salt 1, metal salt 2, and the sulfur source compound. The resulting mixture is conveyed away from inline mixer 126 to the catalyst activation zone 170 which is shown in FIG. 2B as part of the catalyst preparation unit part 100B. Inline mixer 130 receives and mixes the oil O and the solution containing metal salt 3 MS-3. Advantageously, the latter step is performed as close as possible to the reactor vessel which will be described hereinbelow. The resulting mixture is conveyed away from inline mixer 130 and joins the downstream conveyance of the output from inline mixer 126 to the catalyst activation zone 170. Downstream of the point of joining output of the inline mixers 126 and 130, the mixture being conveyed to the catalyst activation zone 170 includes an emulsion of oil O, water, metal salt 1 MS-1, metal salt 2, MS-1, metal salt 3 MS-3 and the sulfur source compound S. Specific conditions and mole fractions of metals used in an example embodiment appropriate for in situ catalytic upgrading will be described in the examples provided hereinbelow. It is to be noted that in this embodiment, inline mixers 126 and 130 are referred to as "hydrocarbon mixing and conveyance systems." Similar inline mixers described in additional embodiments hereinbelow are other examples of hydrocarbon mixing and conveyance systems.

Turning now to FIG. 2B, which is a continuation of the process of FIG. 2A, the second part 100B of the catalyst production unit is shown. The emulsion mixture which includes oil O, the three metal salts MS-1, MS-2, and MS-3, the sulfur source compound S and water H2O is conveyed to a reactor 172 in the catalyst activation zone 170 which heats the emulsion mixture to vaporize the water and generate the ultra-dispersed catalyst. The emulsion mixture enters the top of the reactor 172 and exits the bottom of the reactor 172, where it is conveyed to the separation zone 180 of the second part 100B of the catalyst preparation unit. The separation zone 180 includes a gas/liquid separator 182 whose function is to remove gas and water vapor G to provide ultra-dispersed catalyst in oil CO. After this step, the product is conveyed to dosing pump 184 where mixing with hydrogen H2 (from outside of the catalyst preparation unit)

is controlled. With the addition of hydrogen H2, the ultra-dispersed catalyst in oil is ready for injection into a well in an in situ catalytic upgrading process. The skilled person will recognize that in alternative embodiments, the ultra-dispersed catalyst in oil CO may be used in other hydrocarbon recovery processes which do not require the presence of hydrogen. In such alternative embodiments, the hydrogen source and input line would be omitted from the process flow shown in FIG. 2B. This also applies to other embodiments described hereinbelow.

It is also understood that the embodiment as described above may be utilized to formulate bi-metallic catalysts where one of the metal salts 1 or 2 may be omitted such that the salt at 126 contains only one metal salt such that a bi-metallic catalyst is formed in the catalyst activation zone 170.

Embodiment 2: Catalyst Preparation Unit for a Salt Composite Feed Process

Figure 3A:
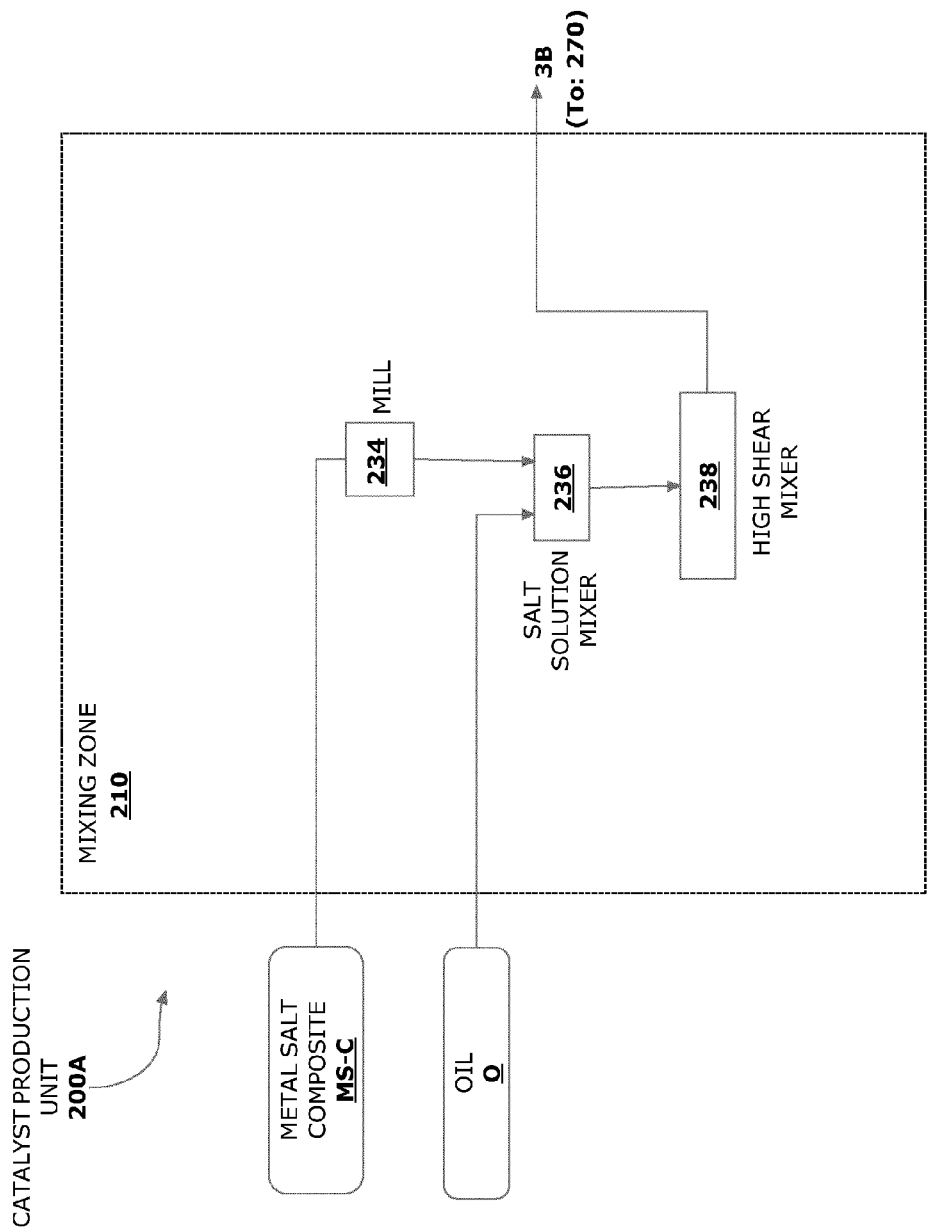
FIG. 3A is the first part of a process flow diagram for a catalyst preparation unit that produces a mixture of an activated ultra-dispersed catalyst in oil, according to a second process designated as Salt Composite Feed Process.
Figure 3B:
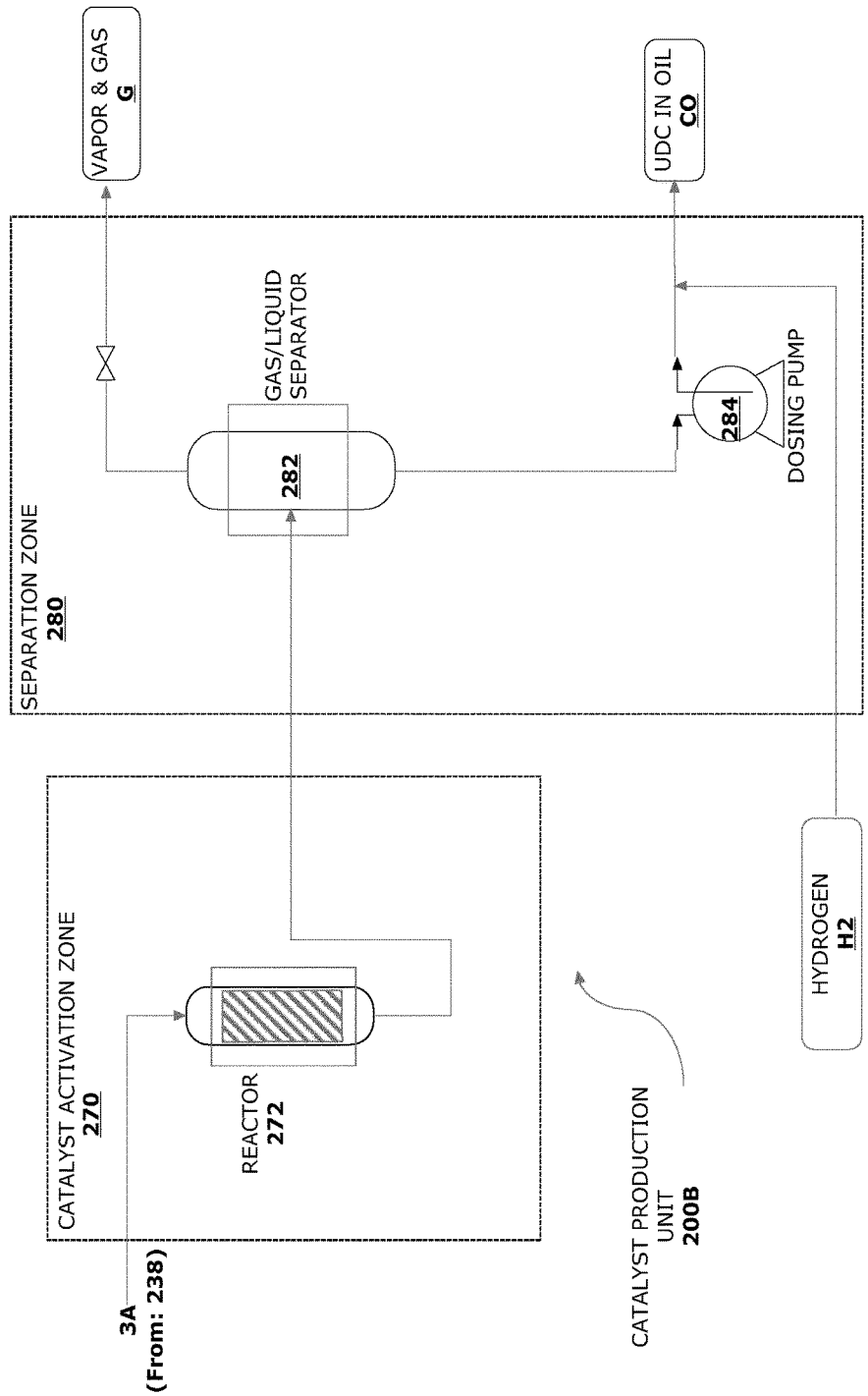
FIG. 3B is the second part of a two-part process flow diagram described for FIG. 3A.

According to another embodiment of the present invention, a catalyst preparation unit is provided which is designed to prepare ultra-dispersed catalyst in oil according to a process designated herein as "salt composite feed." In a manner similar to FIGS. 2A and 2B, the present embodiment of the catalyst preparation unit is shown in two parts (200A and 200B) in FIGS. 3A and 3B, respectively.

Turning now to FIG. 3A, there is shown a mixing zone 210 in part 200A of the catalyst preparation unit. It is seen that material inputs include an oil O (which may be a heavy oil fraction or vacuum distillation residue or similar sample), and a mixture of three different metal salts, each in solid form and one or more compounds providing a reactant source of sulfur. This mixture is referred to as a "metal salt composite" MS-C.

The metal salt composite MS-C is conveyed to a mill 234 whose function is to grind the solids to reduce particle sizes to at least within the micrometer range (typically 5-100 microns). Unlike the tri-metallic catalyst preparation described with respect to FIGS. 2A and 2B, the present process does not require addition of water for preparing aqueous metal salt solutions prior to mixing with the oil. The reduced particle size metal salt composite MS-C emerging from the mill 234 is conveyed to a salt solution mixer 236 where it is mixed directly with the oil O. When uniformly mixed, the mixture is conveyed to a high shear mixer 238 which further reduces the size of particles suspended in the oil O.

Following sufficient mixing in the shear mixer 238, the mixture is conveyed to the reactor 272 in the catalyst activation zone 270 which is shown in FIG. 3B.

FIG. 3B is a continuation of the process of FIG. 3A. The mixture containing oil O, the three metal salts MS-1, MS-2 and MS-3, and the sulfur source compound S is conveyed to a reactor 272 in the catalyst activation zone 270 which heats the emulsion mixture to generate the ultra-dispersed catalyst. The emulsion mixture enters the top of the reactor 272 and exits the bottom of the reactor 272. It is then conveyed to the separation zone 280 of the second part 200B of the catalyst preparation unit. The separation zone 280 includes a gas/liquid separator 282 whose function is to remove gas and water vapor G to provide ultra-dispersed catalyst (UDC) in oil CO. After this step, the product is conveyed to dosing pump 284 where mixing with hydrogen H2 (from outside of the catalyst preparation unit) is controlled. With the addition of hydrogen the ultra-dispersed catalyst in oil is ready for injection into a well in an in situ catalytic upgrading process.

As described above for FIGS. 2A and 2B, the skilled person will recognize that in alternative embodiments, the ultra-dispersed catalyst in oil CO may be used in other hydrocarbon recovery processes which do not require the presence of hydrogen, as described above with respect to embodiment 1.

As noted above, water is not added in this process because a solid metal salt composite is employed. In cases where it can be reasonably ensured that the amount of water in the source oil O and in the metal salt composite is negligible, it may be possible to omit the liquid/gas separator from the catalyst preparation unit. Such an alternative embodiment is also within the scope of the invention.

Similarly, as with embodiment 1, a mono- or bi-metallic catalyst may be synthesized with the embodiment as described in embodiment 2 by altering the number of metal salts within the metal salt composite as appropriate.

Embodiment 3: Catalyst Preparation Unit for a Mono-Metallic Catalyst Preparation Process According to another embodiment of the present invention, a catalyst preparation unit is provided which is designed to prepare ultra-dispersed catalyst in oil according to a process designated herein as "mono-metallic catalyst preparation." In a manner similar to FIGS. 2A and 2B as well as FIGS. 3A and 3B, the present embodiment of the catalyst preparation unit is shown in three parts (300A and 300B and 300C) in FIGS. 4A, 4B and 4C, respectively. This embodiment provides a mixture of three different mono-metallic catalyst compounds by separate reactions of three different metal salt compounds with a sulfur source compound. However, the skilled person will recognize that alternative embodiments are possible wherein only one, only two or more than three metal salts are used to generate distinct mono-metallic catalyst compounds. Therefore, alternative embodiments are contemplated wherein fewer or more catalyst reactant mixing and conveyance systems are included in the catalyst preparation unit and these alternative embodiments are also within the scope of the invention because the catalyst preparation unit of embodiment 3 may be modified appropriately to arrive at such alternative embodiments without undue experimentation.

Figure 4A:
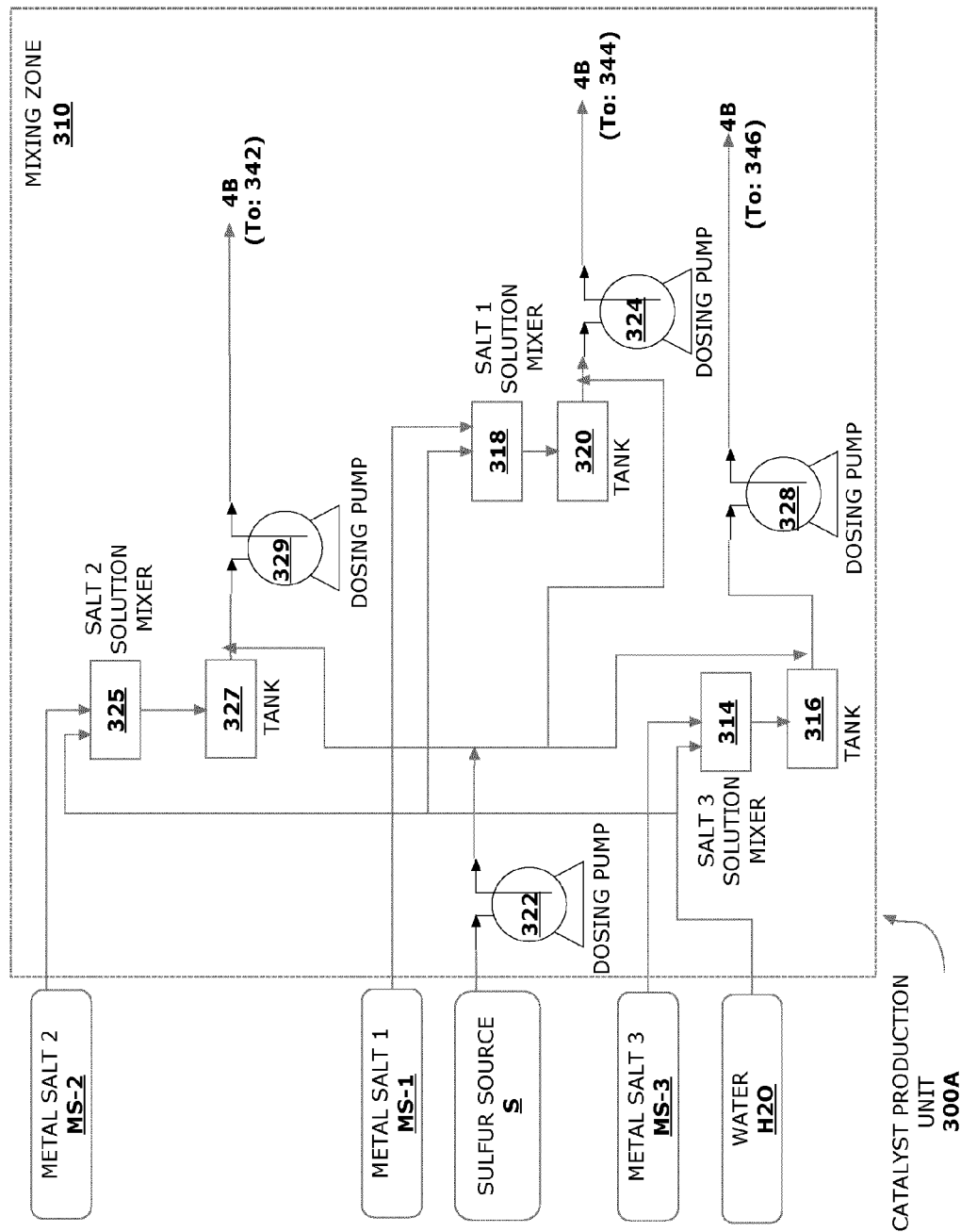
FIG. 4A is the first part of a three-part process flow diagram for a catalyst preparation unit that produces a mixture of an activated ultra-dispersed catalyst in oil according to a third process designated as Mono-metallic Catalyst Preparation.

In FIG. 4A, there is shown a mixing zone 310 in part 300A of the catalyst preparation unit. It is seen that material inputs include metal salts 1, 2 and 3 (MS-1, MS-2 and MS-3), a sulfur source compound S, and water H2O. Each of the metal salts is separately mixed with water to form a solution, conveyed to its own solution tank and pumped downstream by its own dosing pump. Accordingly, metal salt 1 MS-1 is conveyed to salt solution mixer 318 where it is mixed with water to form a solution and then sent to tank 320 where it is drawn downstream by dosing pump 324. Likewise, metal salt 2 MS-2 is conveyed to salt solution mixer 325, mixed with water, sent to tank 327 and drawn to dosing pump 329. Metal salt 3 MS-3 is conveyed to salt solution mixer 314, mixed with water, sent to tank 316 and drawn downstream by dosing pump 328.

The sulfur source compound S is conveyed by dosing pump 322 to the downstream lines from each of the tanks 316, 320 and 327 to add the sulfur source compound to each of the metal salt solutions prior to entrance into each of the individual metal salt dosing pumps 324, 328 and 329. The downstream conveyance of these metal salt and sulfur source compound mixtures leads to a series of corresponding inline mixers 344, 346 and 342 which are shown in FIG. 4B.

Figure 4B:
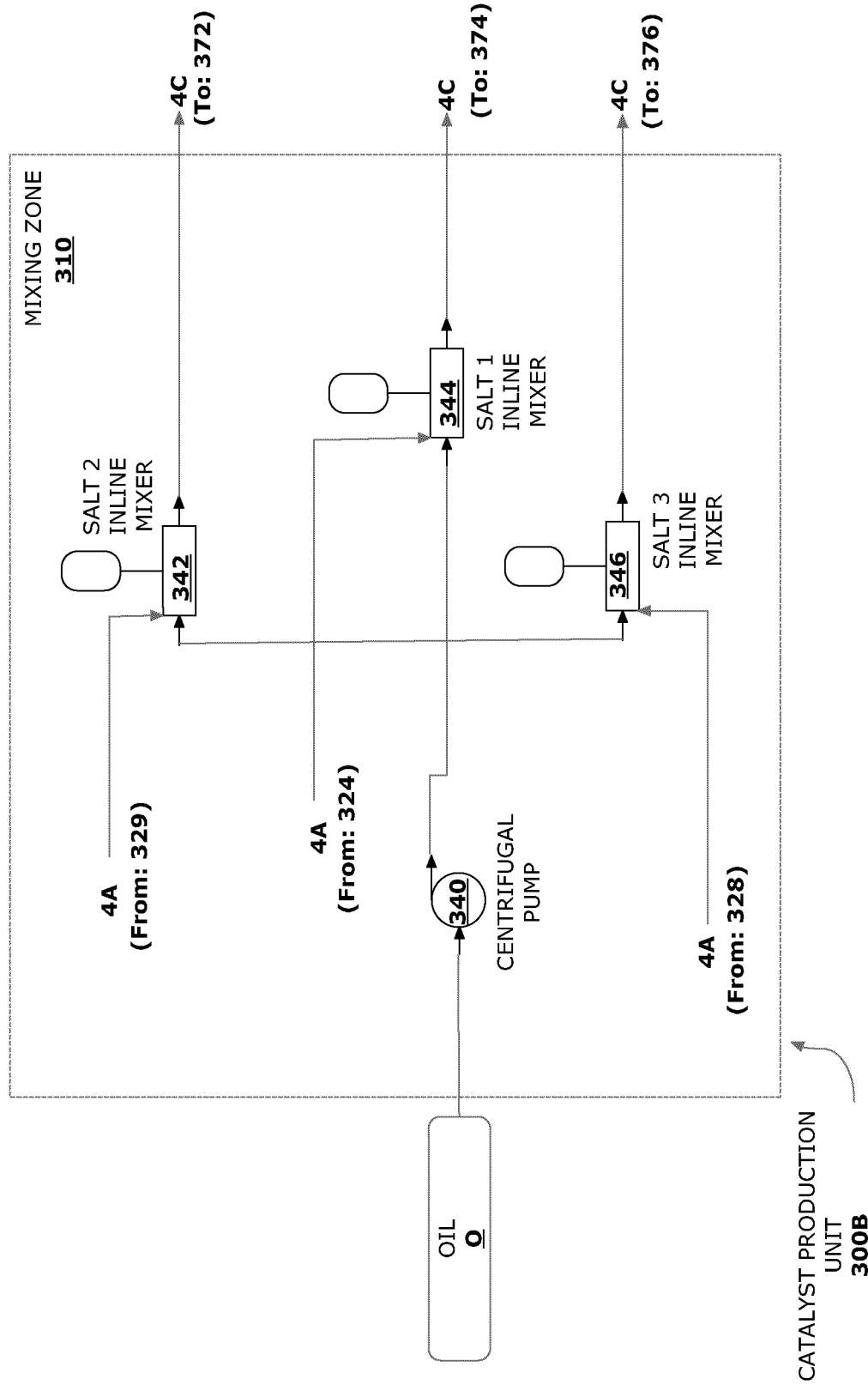
FIG. 4B is the second part of the process flow diagram described for FIG. 4A.

In FIG. 4B, which is a continuation of FIG. 4A, it is seen that the output from each of dosing pumps 324, 328 and 329 is conveyed to corresponding inline mixers 344, 346 and 342 (which are also located in the mixing zone 310) where the metal salt and sulfur mixtures are further mixed with oil O conveyed by centrifugal pump 340. After sufficient mixing of the complete reaction mixtures in each of the inline mixers 344, 346 and 342, they are conveyed to the catalyst activation zone 370 and to corresponding reactors 374, 376 and 372 which are shown in FIG. 4C.

Figure 4C:
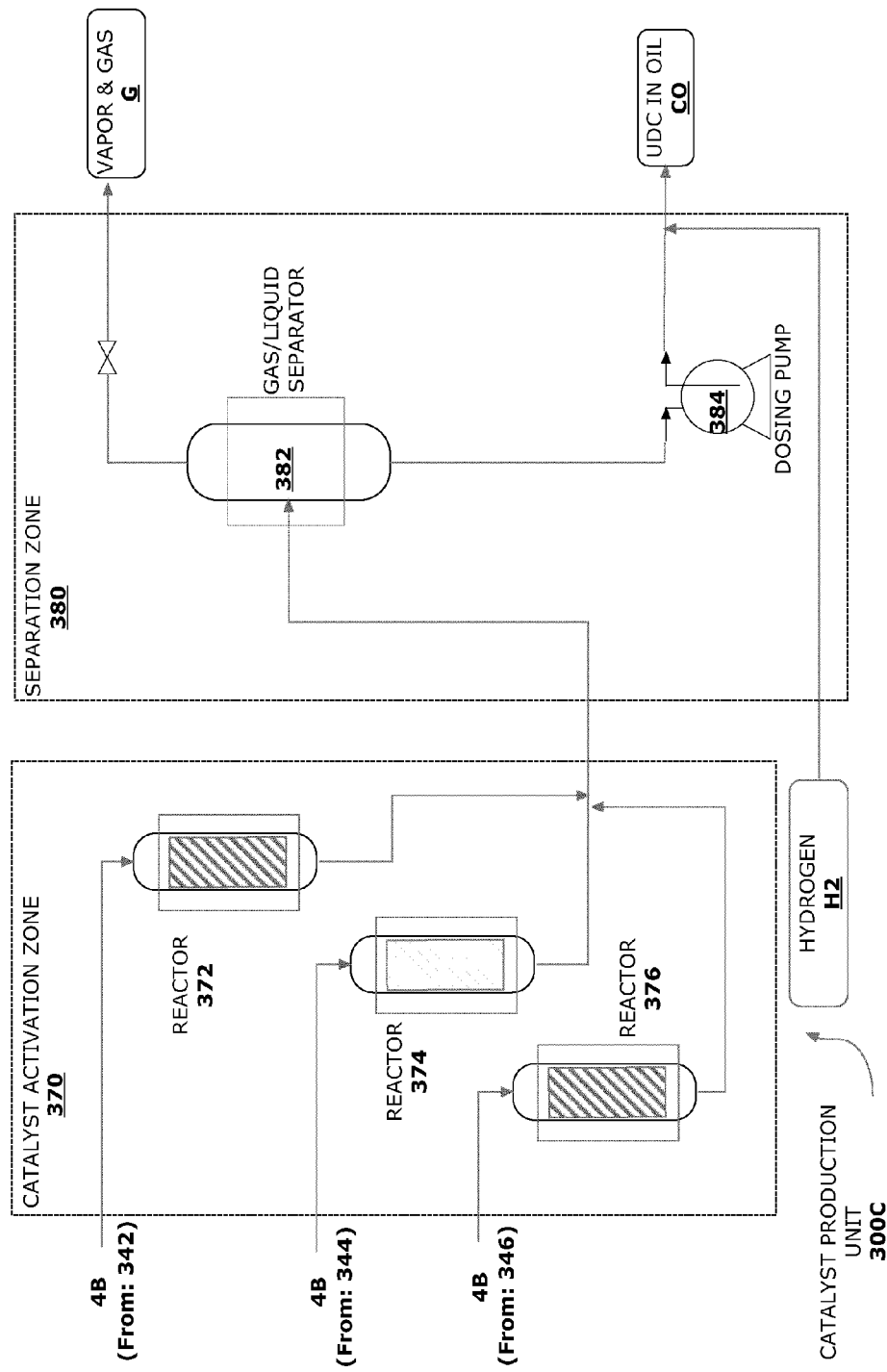
FIG. 4C is the third part of the process flow diagram described for FIG. 4A.

In FIG. 4C, which is a continuation of FIG. 4B, it can be seen that the three individual reaction mixtures conveyed from inline mixers 342, 344 and 346 are conveyed to corresponding reactors 372, 374 and 376. The reactors heat the three mixtures and generate individual mixtures of mono-metallic ultra-dispersed catalysts in oil, as for embodiments 1 and 2. The output of these three reactors 372, 374 and 376 is merged downstream and sent to the separation zone 380 where it enters gas/liquid separator 382. Subsequent downstream processing is the same as described for embodiments 1 and 2 with the output from the gas/liquid separator 382 conveyed to dosing pump 384 where mixing with hydrogen H2 (from outside of the catalyst preparation unit) is controlled. Vapor and gas G is removed and ultra-dispersed catalyst in oil CO is obtained.

With the addition of hydrogen the ultra-dispersed catalyst in oil is ready for injection into a well in an in situ catalytic upgrading process. As described above, the skilled person will recognize that in alternative embodiments, the ultra-dispersed catalyst in oil CO may be used in other hydrocarbon recovery processes which do not require the presence of hydrogen.

Embodiment 4: Combination Catalyst Preparation Unit Configured for Composite Salt Feed and for Mono-Metallic Catalyst Preparation It is recognized that it is advantageous to provide a catalyst preparation unit with means for conducting more than one process from among the processes described above. Therefore, a fourth embodiment of the catalyst preparation unit is configured to generate ultra-dispersed catalyst in oil by either the composite salt feed process or by the mono-metallic catalyst preparation process. Accordingly, certain unique components of embodiments 2 and 3 are included in this combination unit, while other components which are common to both of these embodiments are shared.

Figure 5A:
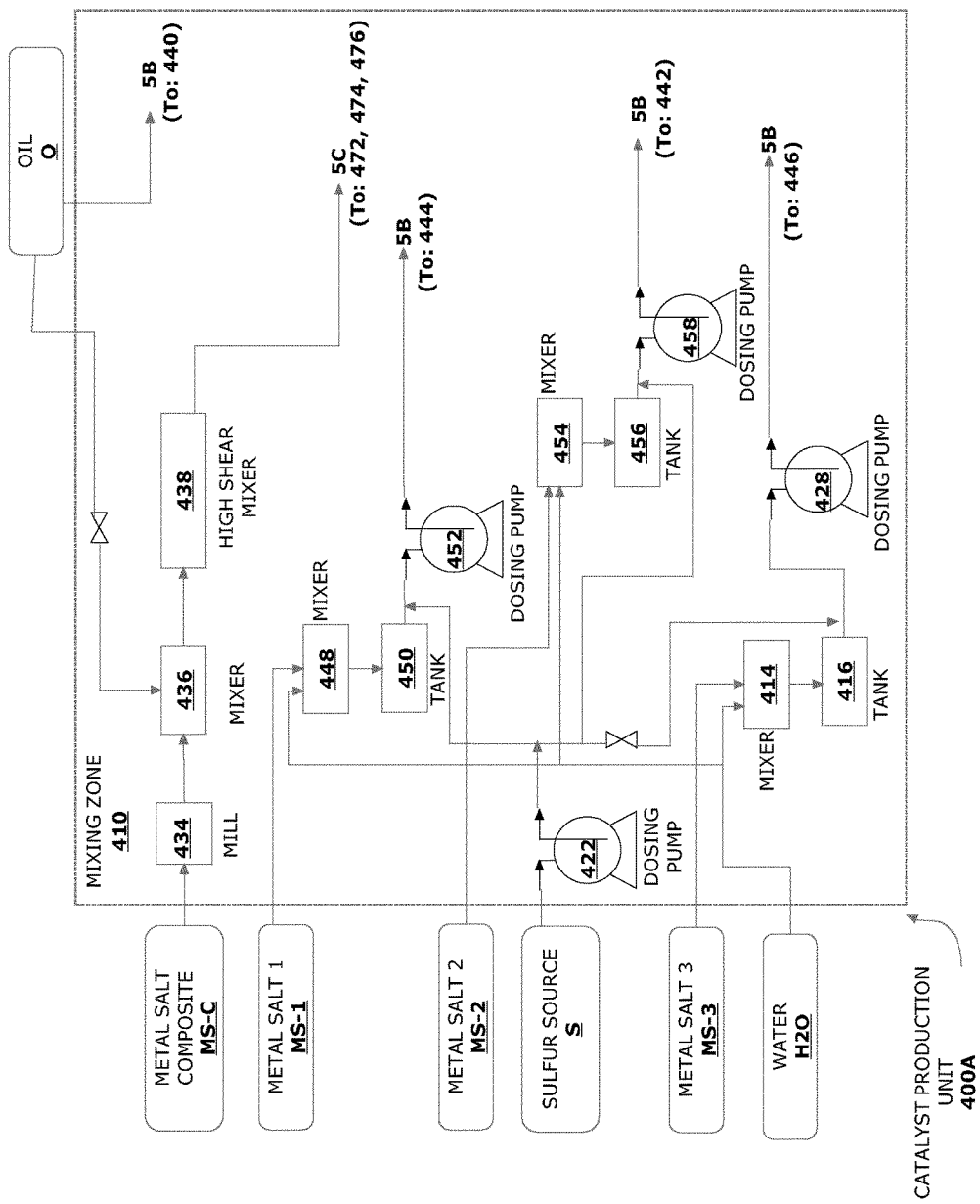
FIG. 5A is the first part of a three-part process flow diagram for a catalyst preparation unit that produces a mixture of an activated ultra-dispersed catalyst in oil according to, either the second process described for FIG. 3A or the third process described for FIG. 4A.
Figure 5B:
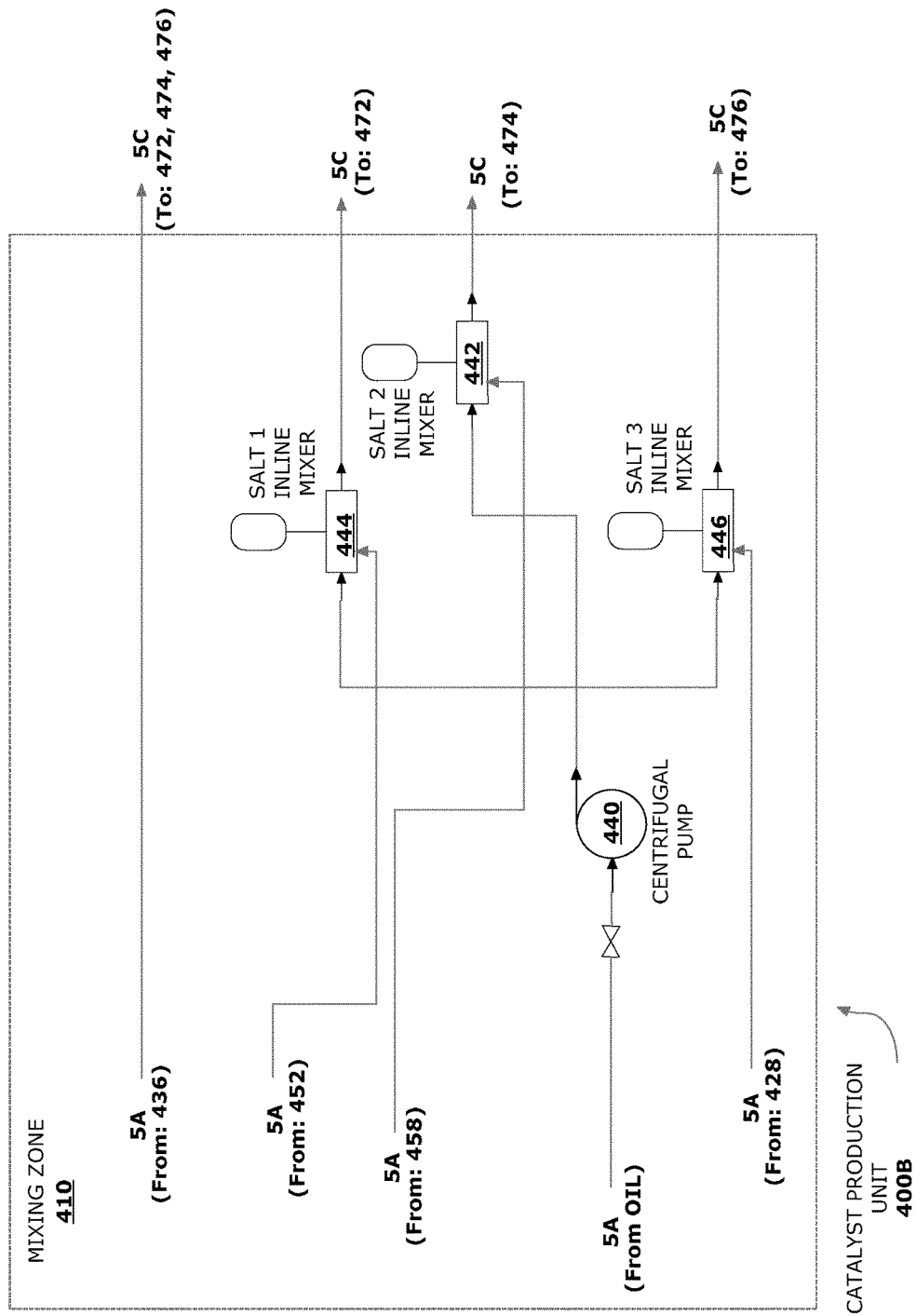
FIG. 5B is the second part of the process flow diagram described for FIG. 5A.
Figure 5C:
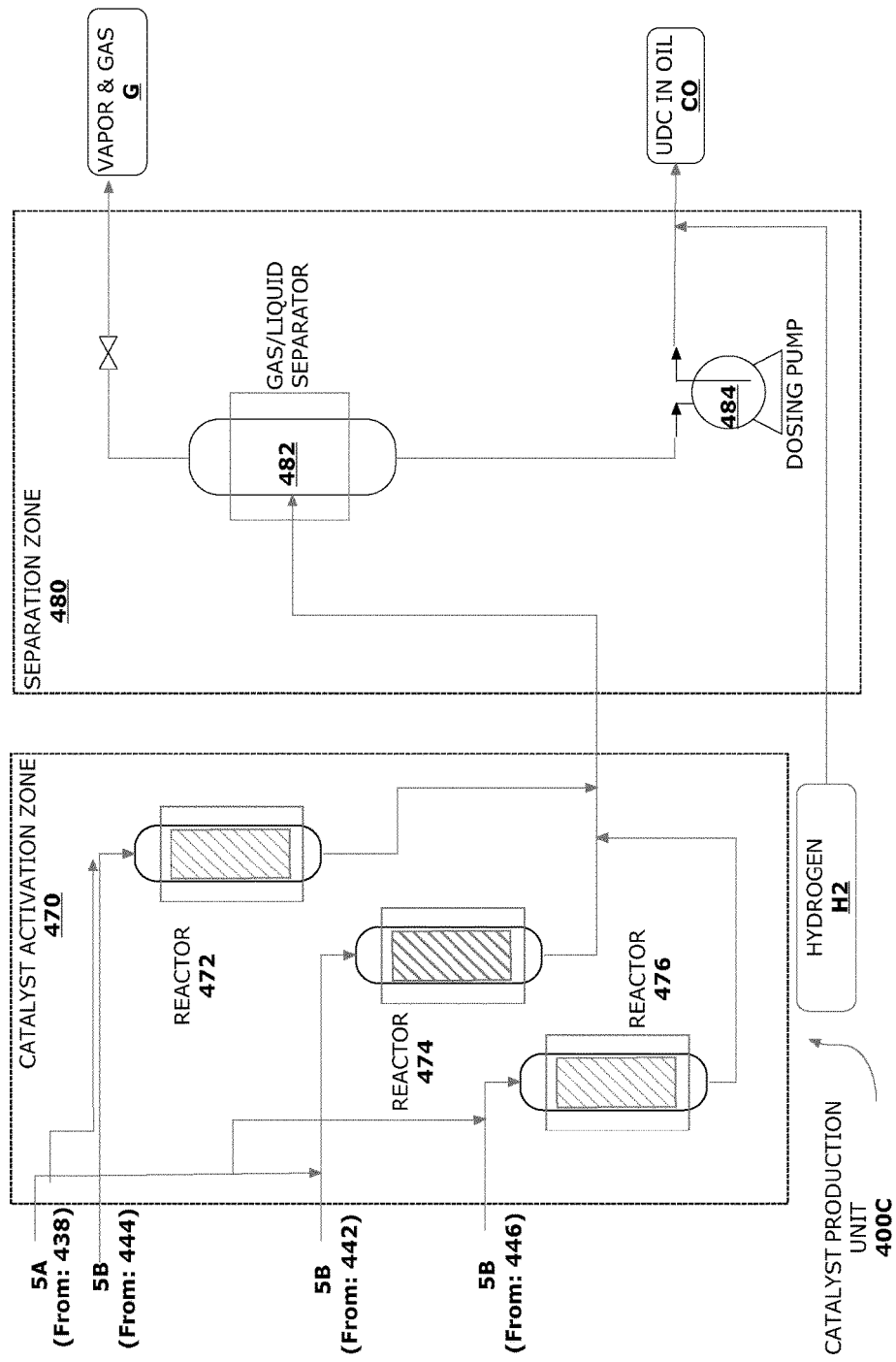
FIG. 5C is the third part of the process flow diagram described for FIG. 5A.

In a manner similar to FIGS. 4A, 4B and 4C, the present embodiment of the catalyst preparation unit is shown in three parts (400A and 400B and 400C) in FIGS. 5A, 5B and 5C, respectively.

Firstly, the components of the catalyst preparation unit responsible for the composite salt feed process will be described, followed by a description of the components responsible for the mono-metallic catalyst preparation process.

Turning now to FIG. 5A, there is shown a mixing zone 410 in part 400A of the catalyst preparation unit. It is seen that material inputs include an oil O (which may be a heavy oil fraction or vacuum distillation residue or similar sample), and a mixture of three different metal salts, each in solid form and one or more compounds providing a reactant source of sulfur. This mixture is referred to as a "metal salt composite" MS-C.

The metal salt composite MS-C is conveyed to the mixing zone 410 and to a mill 434 whose function is to grind the solids to reduce particle sizes to at least within the micrometer range (typically 5-100 microns). The composite feed process does not require addition of water for preparing aqueous metal salt solutions prior to mixing with the oil. The metal salt composite MS-C emerging from the mill 434 is conveyed to a salt solution mixer 436 where it is mixed directly with the oil O. When uniformly mixed, the mixture is conveyed to a high shear mixer 438 which further reduces the size of particles suspended in the oil O.

Following sufficient mixing in the shear mixer 438, the mixture is conveyed to each of the reactors 472, 474 and 476 in the catalyst activation zone 470 which is shown in FIG. 5C. In the reactors 472, 474 and 476, the reaction mixture is heated to generate the ultra-dispersed catalyst in oil, which is subsequently conveyed out of the catalyst activation zone and into the separation zone 480 where vapor and gas G is separated. Subsequent downstream processing is the same as described for the embodiments described above with the output from the gas/liquid separator 482 conveyed to dosing pump 484 where mixing with hydrogen H2 (from outside of the catalyst preparation unit) is controlled. With the addition of hydrogen the ultra-dispersed catalyst in oil CO is ready for injection into a well in an in situ catalytic upgrading process.

Returning now to FIG. 5A, the components responsible for the mono-metallic catalyst preparation process will now be described.

In FIG. 5A, it is seen that material inputs for the mono-metallic catalyst preparation process include metal salts 1, 2 and 3 (MS-1, MS-2 and MS-3) a sulfur source compound S, and water H2O. Each of the metal salts is separately mixed with water to form a solution, conveyed to its own solution tank and pumped downstream by its own dosing pump. Accordingly, metal salt 1 MS-1 is conveyed to salt solution mixer 448 where it is mixed with water to form a solution and then sent to tank 450 where it is drawn downstream by dosing pump 452. Likewise, metal salt 2 MS-2 is conveyed to salt solution mixer 454, mixed with water, sent to tank 456 and drawn to dosing pump 458. Metal salt 3 MS-3 is conveyed to salt solution mixer 414, mixed with water, sent to tank 416 and drawn downstream by dosing pump 428.

The sulfur source compound S is conveyed by dosing pump 422 to the downstream lines from each of the tanks 450, 454 and 416 to add the sulfur source compound to each of the metal salt solutions prior to entrance into each of the individual metal salt dosing pumps 452, 458 and 428. The downstream conveyance of these metal salt and sulfur source compound S mixtures leads to a series of corresponding inline mixers 444, 442 and 446 which are shown in FIG. 5B.

In FIG. 5B, which is a continuation of FIG. 5A, it is seen that the output from each of dosing pumps 452, 458 and 428 is conveyed to corresponding inline mixers 444, 442 and 446 (which are also located in the mixing zone 410) where the metal salt and sulfur mixtures are further mixed with oil O conveyed by centrifugal pump 440. After sufficient mixing of the complete reaction mixtures in each of the inline mixers 444, 442 and 446, they are conveyed to the catalyst activation zone 470 and to corresponding reactors 472, 474 and 476 which are shown in FIG. 5C.

In FIG. 5C, which is a continuation of FIG. 5B, it can be seen that the three individual reaction mixtures conveyed from inline mixers 444, 442 and 446 are conveyed to corresponding reactors 472, 474 and 476. The reactors heat the three mixtures and generate individual mixtures of mono-metallic ultra-dispersed catalysts in oil. The output of these three reactors 472, 474 and 476 is merged downstream and sent to the separation zone 480 where it enters gas/liquid separator 482. Subsequent downstream processing is the same as described for the other embodiments with the output from the gas/liquid separator 482 conveyed to dosing pump 484 where mixing with hydrogen (from outside of the catalyst preparation unit) is controlled. Thus it is seen that all components of the catalyst activation zone 470 and the separation zone 480 are shared between the two processes. With the addition of hydrogen the ultra-dispersed catalyst in oil is ready for injection into a well in an in situ catalytic upgrading process.

EXAMPLES

The foregoing description will be more fully understood with reference to the following examples. These examples are, however, exemplary of methods of using certain aspects of the present invention and are not intended to impose limits on the scope of the invention as defined by the appended claims.

In each of the examples, metal salt 1 is ammonium heptamolybdate, metal salt 2 is ammonium metatungstate, metal salt 3 is nickel acetate, the sulfur source compound is ammonium sulfide or thiourea and the oil is vacuum residue from a distillation process, which is hereinafter simply referred to as "vacuum residue." In each example, the amount of hydrogen to be mixed with the ultra-dispersed catalyst in oil prior to injection in an in situ upgrading process is 120 Scc/gr/h of vacuum residue. The vacuum residue being fed to the catalyst preparation unit should not exceed about 240° C. The stream of ultra-dispersed catalyst in oil should be no lower than about 280° C. prior to injection into a well for in situ catalytic upgrading of hydrocarbons.

Example 1: Preparation of Ultra-Dispersed Trimetallic Catalyst in Oil for Use in In Situ Catalytic Upgrading In this process, which can be performed by a catalyst preparation unit with features similar to those of Embodiment 1 described above, the total amount of water used for the preparation of the salt solutions should be around 2% wt of the feed (vacuum residue). This value is set to ensure a minimum amount of water in which the salts can be completely dissolved (at ambient temperature) to meet the reactor vapor requirement, and to ensure the formation of a stable suspension (vacuum residue/salt solution) with a minimum bubble size dispersion. In this example and subsequent examples, Metal salt 1 is ammonium heptamolybdate, metal salt 2 is ammonium metatungstate, metal salt 3 is nickel acetate, the sulfur source compound is ammonium sulfide or thiourea and the oil is vacuum residue from a distillation process.

The amount of salt in solution also depends on the feed and desired target concentration. In certain embodiments, for a representative in situ catalytic upgrading process, a total catalyst (metal) concentration of 720 ppm is added. The amount of each metal required is calculated by the following relationships:

Mole fraction of Ni: $Ni/(Ni+Mo+W)=0.3$ (1)

Relationship of Ni to Ni+W: $Ni/(Ni+W)=0.653$ (2)

Relationship of Ni to Ni+Mo: $Ni/(Ni+Mo)=0.36$ (3)

Relationship of Mo to W: $Mo/W=3$ (4)

The amount of ammonium sulfide (or thiourea) is determined based on the stoichiometry of sulfured nickel, molybdenum, and tungsten compounds. This would be a mole of sulfur per mole of nickel and two moles of sulfur per mole of molybdenum and tungsten. However, in this option (as it was tested in the laboratory) a relation of three moles of sulfur per mole of molybdenum and tungsten was used. This way the ammonium sulfide is only added to the stream of the solution of metal salts 1 and 2.

While mixing with the vacuum residue the water should remain in liquid form so that a stable suspension can be formed before entering the reactor. For this reason a maximum temperature in the vacuum residue entering the unit is set at 240° C. and a maximum pressure in the unit is set at 4000 KPa. Once the salt solutions are prepared and mixed with vacuum residue the solutions enter the catalyst activation zone and enter the reactor. Representative conditions include heating of the emulsion to 370° C. By the time the fluid reaches this temperature, the water should be completely vaporized and the catalyst should be active and ultra-dispersed as nano particles in the vacuum residue. A given volume of liquid should remain in the reactor between about 2.4 to about 2.6 min to allow sufficient time for binding of the metal ions to the hydrocarbons. The liquid should enter the reactor from the top and exit through the bottom to avoid the accumulation of metals in the bottom of the reactor.

Since the direction of the flow is from top to bottom in a reactor that has the form of a vertical tube and vaporization is occurring, avoidance of slug flow is desirable and obtained by keeping the velocity lower than 0.09 m/s and the volume of vapor inside the reactor under 50% vol.

The vapor-liquid stream that exits the reactor then enters the separation zone and is conveyed to a gas-liquid separator. This separator should be close to the reactor and should be insulated in order to avoid heat loss. The vapours and gases produced should be tested and treated if necessary before sending it to the atmosphere or any other facility. The liquid from the separator is mixed with hydrogen and then injected to the well as described in Canadian Patent 2,810,022, which is incorporated herein by reference in entirety.

Example 2: Salt Composite Feed Process Conditions for Producing Ultra-Dispersed Catalyst for In Situ Catalytic Upgrading In this process, which can be performed by a catalyst preparation unit with features similar to those of Embodiment 2 described above, the salt solutions are substituted with a composite which includes all of the required metal salts and a sulfur source compound. The molar relationships of the metals are the same as described in Example 1.

The salt composite enters a mill to reduce any big particle within it to a powder size in the range of 50 to 100 μm. This composite then is mixed directly with vacuum residue in a tank with a high shear mixer. As in described in Example 1, the composite/oil are mixed in a batch mode.

The reactor in the catalyst activation zone in this example should provide conditions similar to those described in Example 1. Since water is not added to the process, the velocity requirement for the preparation may vary.

The amount of vapor produced in the reactor may be negligible without the addition of water. In such a case, the use of a gas/liquid separator in the process is optional.

Example 3: Preparation of Ultra-Dispersed Monometallic Catalyst in Oil for Use in In Situ Catalytic Upgrading In this example, the vacuum residue entering the unit is divided into three streams to be mixed with three salt solutions.

In a manner similar to that described for Example 1 and Embodiment 1, the solutions are prepared mixing the metal salts and water. The operation is carried out in a batch mode for a period of time, to ensure the complete dissolutions of the salts in each case. Subsequently, each solution is sent to a corresponding tank, to be later mixed with ammonium sulfide or thiourea. The resulting solutions are then mixed with vacuum residue separately. The total amount of water used for the preparation of the salt solutions is around 2% by weight of the feed (vacuum residue).

The molar relationships and amounts of the metals are the same as in Example 1. The amount of ammonium sulfide (or thiourea) is determined based on the stoichiometry of sulfured nickel, molybdenum, and tungsten compounds. Once determined, each stream of ammonium sulfide (or thiourea) is then mixed with the corresponding water-salt solution.

The conditions for the vacuum residue/water mixing are the same as in Example 1 (maximum temperature in the vacuum residue entering the unit 240° C. and a maximum pressure in the unit is set at 4000 KPa). Once the salt solutions are prepared and mixed with vacuum residue, each separate stream (three in total) enter different reactors under conditions described in Example 1.

The vapor-liquid streams that exit the reactors are then mixed, and enter the gas-liquid separator in the separation zone. This gas/liquid separator should be close to the reactors and should be insulated in order to avoid heat loss. The vapors and gasses produced should be tested and treated if necessary before sending it to the atmosphere or any other facility. The liquid from the separator is mixed with hydrogen and then injected to the well as described in Canadian Patent 2,810,022, which is incorporated herein by reference in entirety.

EQUIVALENTS AND SCOPE

Although the present invention has been described and illustrated with respect to preferred embodiments and preferred uses thereof, it is not to be so limited since modifications and changes can be made therein which are within the full, intended scope of the invention as understood by those skilled in the art. Each of the references cited herein is incorporated herein by reference in entirety.

The invention claimed is:

1. A catalyst preparation unit for producing an activated hydrocarbon-catalyst mixture, the catalyst preparation unit comprising:
    i) one or more catalyst reactant input conduits;
    ii) a hydrocarbon input conduit;
    iii) a water input conduit;
    iv) one or more catalyst reactant mixing and conveyance systems for receiving and mixing catalyst reactants from the catalyst component input conduits and water provided by the water input conduit to provide one or more catalyst reactant solutions configured to fully dissolve the catalyst reactants in water;
    v) one or more hydrocarbon mixing and conveyance systems for receiving and mixing the catalyst reactant solutions and hydrocarbons provided by the hydrocarbon input conduit and configured to produce a stable hydrocarbon-catalyst suspension in liquid form;
    vi) at least one reactor located downstream of the mixers, for receiving and activating the hydrocarbon-catalyst suspension, wherein the reactor is configured to produce the activated hydrocarbon catalyst mixture by heating the hydrocarbon-catalyst suspension to completely vaporize the water and form nanoparticles of catalyst suspended in the hydrocarbon;
    vii) a gas/liquid separator located downstream of the reactor, for removing vapors and gas from the activated hydrocarbon-catalyst mixture; and
    viii) an output conduit for transporting the activated hydrocarbon-catalyst mixture away from the catalyst preparation unit.

2. The catalyst preparation unit of claim 1, wherein catalyst reactant input conduits, and the catalyst reactant mixing and conveyance systems are chemically compatible with ammonium heptamolybdate, ammonium metatungstate, nickel acetate, cobalt acetate, ammonium sulfide and thiourea or any combination thereof.

3. The catalyst preparation unit of claim 1, wherein the catalyst reactant input conduits include three metal salt conduits and a sulfur source compound conduit.

4. The catalyst preparation unit of claim 1, wherein the catalyst reactant input conduits include two metal salt conduits and a sulfur source compound conduit.

5. The catalyst preparation unit of claim 1, wherein the catalyst reactant input conduits include one metal salt conduit and a sulfur source compound conduit.

6. The catalyst preparation unit of claim 1, wherein each of the catalyst reactant mixing and conveyance systems includes a solution mixer for generating a catalyst reactant solution and a dosing pump for conveying specified volumes of the catalyst reactant solution to one of the hydrocarbon mixing and conveyance systems.

7. The catalyst preparation unit of claim 6, wherein each of the hydrocarbon mixing and conveyance systems comprises a centrifugal pump and an inline mixer, wherein the centrifugal pump is for drawing the hydrocarbons from outside of the catalyst preparation unit and conveying the hydrocarbons to the inline mixer for mixing with the catalyst reactant solution.

8. The catalyst preparation unit of claim 1, comprising two catalyst reactant mixing and conveyance systems and two hydrocarbon mixing and conveyance systems, wherein
    one of the two catalyst reactant mixing and conveyance systems is configured to convey a solution of two different metal salts and a sulfur source compound and the other catalyst reactant mixing and conveyance system is configured to convey a third metal salt solution, and
    wherein one of the two hydrocarbon mixing and conveyance systems is configured to receive and mix the solution of the two different metal salts and the sulfur source compound with the hydrocarbons to produce a first hydrocarbon-catalyst mixture and convey the first hydrocarbon-catalyst reactant mixture to the reactor, and the other hydrocarbon mixing and conveyance system is configured to receive and mix the solution of the third metal salt with the hydrocarbons to produce a second hydrocarbon-catalyst reactant mixture and convey the second hydrocarbon-catalyst reactant mixture to the reactor.

9. The catalyst preparation unit of claim 1, comprising three catalyst reactant mixing and conveyance systems, three hydrocarbon mixing and conveyance systems, and three reactors, wherein each of the three catalyst reactant mixing and conveyance systems is configured to convey a solution of a different metal salt and a sulfur source compound to a corresponding hydrocarbon mixing and conveyance system of the three hydrocarbon mixing and conveyance systems, thereby producing three different hydrocarbon-catalyst reactant mixtures and wherein each of the three hydrocarbon mixing and conveyance systems is further configured to convey its respective hydrocarbon-catalyst reactant mixture of the three different hydrocarbon-catalyst reactant mixtures to one of three corresponding reactors.

10. The catalyst preparation unit of claim 9, wherein reactor output from each of the three corresponding reactors is merged upstream of the gas/liquid separator.

11. The catalyst preparation unit of claim 1, further comprising a hydrogen input conduit for addition of hydrogen to the activated hydrocarbon-catalyst mixture in the output conduit.

12. The catalyst preparation unit of claim 1, wherein the hydrocarbon input conduit is configured for conveyance of heavy oil.

13. The catalyst preparation unit of claim 1, which is provided in modular form and configured for disengagement from a hydrocarbon processing facility, transport by a vehicle and engagement to another hydrocarbon processing facility.

14. A catalyst preparation unit for producing an activated hydrocarbon-catalyst mixture, the catalyst preparation unit comprising:
 a) a catalyst reactant input conduit;
 b) a hydrocarbon input conduit;
 c) a catalyst reactant and hydrocarbon mixing and conveyance system for receiving and mixing catalyst reactants from the catalyst reactant input conduit with hydrocarbons provided by the hydrocarbon input conduit to produce a catalyst reactant and hydrocarbon mixture without water and under high shear conditions;
 d) a reactor located downstream of the catalyst reactant and hydrocarbon mixing and conveyance system, the reactor being configured for receiving, heating and activating the hydrocarbon-catalyst reactant mixture, to produce an ultra-dispersed activated hydrocarbon catalyst mixture;
 e) an output conduit for transporting the ultra-dispersed activated hydrocarbon-catalyst mixture away from the catalyst preparation unit.

15. The catalyst preparation unit of claim 14, wherein the catalyst reactant input conduit is configured for conveyance of a composite mixture of catalyst reactants in solid form.

16. The catalyst preparation unit of claim 14, wherein the catalyst reactant input conduit and the catalyst reactant and hydrocarbon mixing and conveyance system are chemically compatible with ammonium heptamolybdate, ammonium metatungstate, nickel acetate, cobalt acetate, ammonium sulfide and thiourea or any combination thereof.

17. The catalyst preparation unit of claim 16, wherein the catalyst reactant and hydrocarbon mixing and conveyance system comprises a mill for reducing the particle size of reactants, a high shear mixer downstream of the mill for further reducing the particle size of the reactants.

18. The catalyst preparation unit of claim 17, further comprising a centrifugal pump for conveying the hydrocarbon-catalyst reactant mixture to the reactor.

19. The catalyst preparation unit of claim 14, further comprising a hydrogen input conduit for addition of hydrogen to the activated hydrocarbon-catalyst mixture in the output conduit.

20. The catalyst preparation unit of claim 14, wherein the hydrocarbon input conduit is configured for conveyance of heavy oil.

21. A combination catalyst preparation unit for producing an activated hydrocarbon-catalyst mixture by either a mono-metallic catalyst preparation process or a composite salt feed process, the combination catalyst preparation unit comprising:
 a) the catalyst preparation unit as recited in claim 9 for the mono-metallic catalyst preparation process; and
 b) the catalyst preparation unit as recited in claim 18 for the composite salt feed process, wherein
  (1) at least one of the three reactors used for the mono-metallic catalyst preparation process is shared by the catalyst preparation unit for the composite salt feed process; and
  (2) the gas/liquid separator and the output conduit used for the mono-metallic catalyst preparation process are both shared by the catalyst preparation unit for the composite salt feed process.

* * * * *